April 9, 1968     R. M. BERGER ETAL     3,377,220
PROCESS FOR MAKING STABLE ELONGATED ELEMENTS
Filed June 9, 1967     5 Sheets-Sheet 1

INVENTORS
Richard M. Berger
Reavis C. Sproull

BY    Jacobi & Davidson

ATTORNEYS

April 9, 1968 R. M. BERGER ETAL 3,377,220
PROCESS FOR MAKING STABLE ELONGATED ELEMENTS
Filed June 9, 1967 5 Sheets-Sheet 2

INVENTORS
Richard M. Berger
Reavis C. Sproull

BY Jacobi & Davidson

ATTORNEYS

April 9, 1968 R. M. BERGER ETAL 3,377,220
PROCESS FOR MAKING STABLE ELONGATED ELEMENTS
Filed June 9, 1967 5 Sheets-Sheet 3
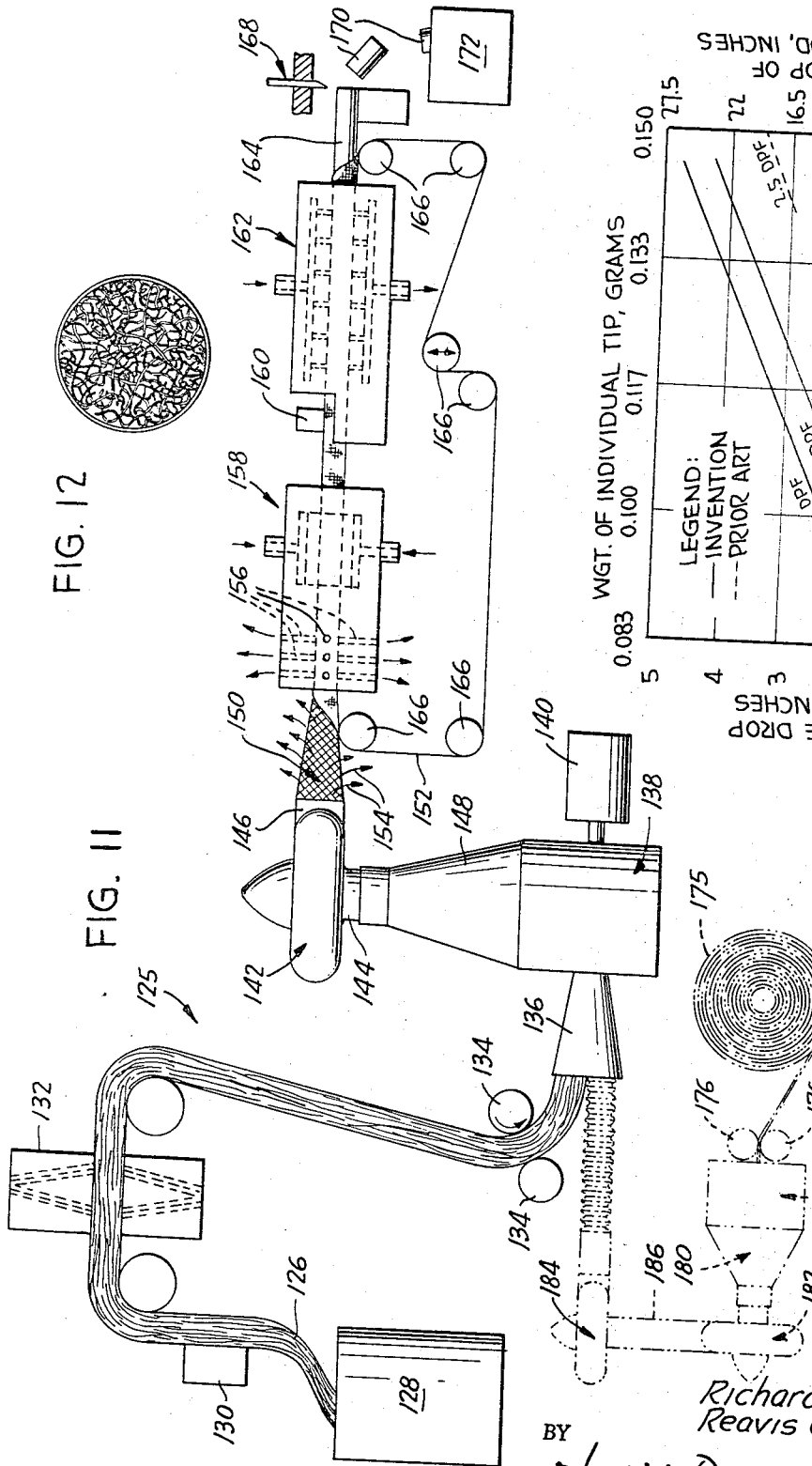
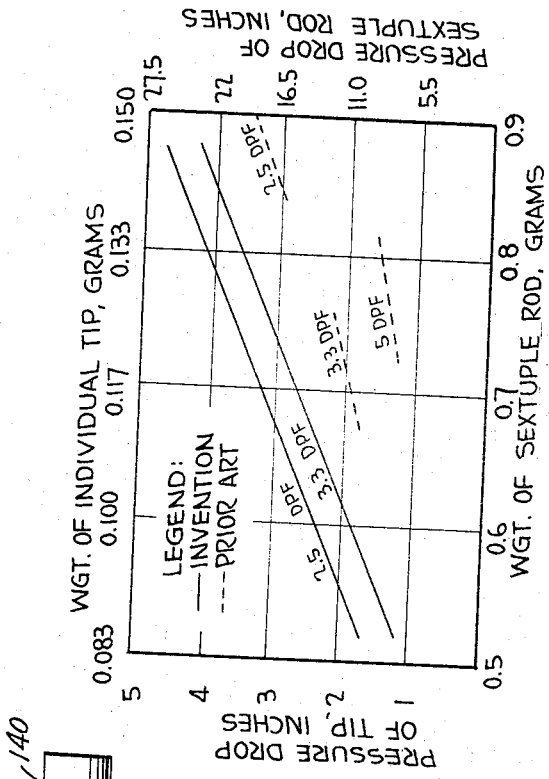
Richard M. Berger
Reavis C. Sproull
INVENTORS
BY Jacobi & Davidson
ATTORNEYS April 9, 1968 R. M. BERGER ETAL 3,377,220
PROCESS FOR MAKING STABLE ELONGATED ELEMENTS
Filed June 9, 1967 5 Sheets-Sheet 4
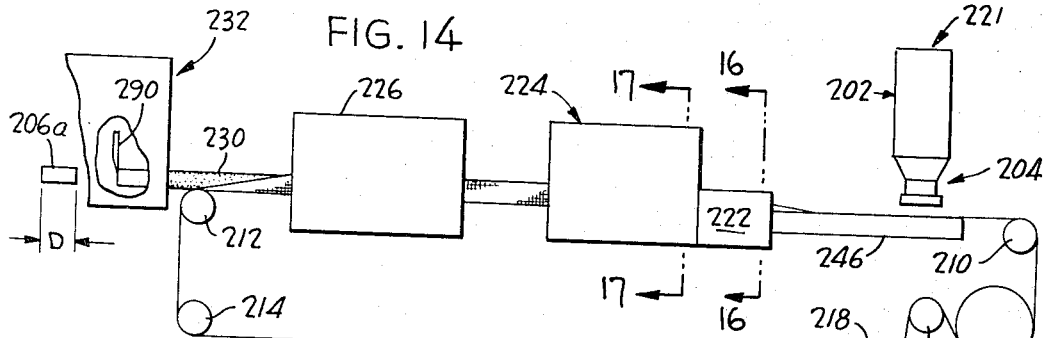
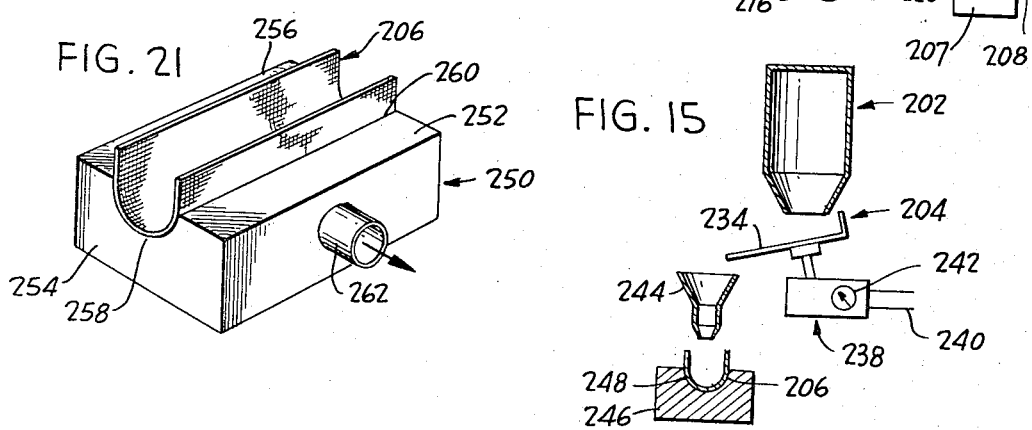
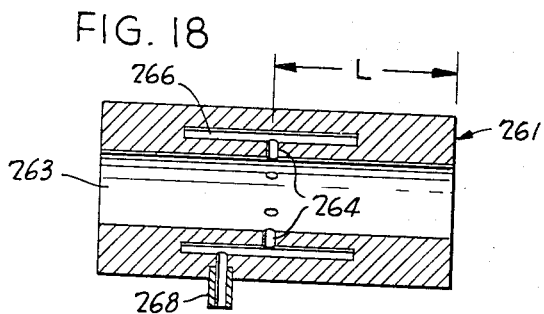
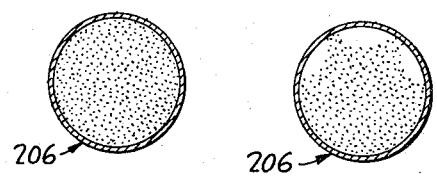
Richard M. Berger
Reavis C. Sproull
INVENTORS
BY Jacobi & Davidson
ATTORNEYS United States Patent Office 3,377,220
Patented Apr. 9, 1968

3,377,220
PROCESS FOR MAKING STABLE
ELONGATED ELEMENTS
Richard M. Berger and Reavis C. Sproull, Richmond, Va., assignors to American Filtrona Corporation, Richmond, Va., a corporation of New York
Continuation-in-part of applications Ser. No. 351,162, Mar. 11, 1964, and Ser. No. 502,250, Oct. 22, 1965. This application June 9, 1967, Ser. No. 644,959
50 Claims. (Cl. 156—62.2)

ABSTRACT OF THE DISCLOSURE

The production of stable elongated elements particularly for use as smoke filters and the like wherein the starting material is carried and formed by a porous belt through which processing fluids such as steam and cooling air can be passed directly into the material being formed. Filamentary tow such as conventional plasticized cellulose acetate can be treated in this manner or can be first chopped into staple fibers and blown into the belt, with the staple fibers primarily transversely to the longitudinal dimension of the final product. Additionally, particulate sorbent materials such as activated carbon and the like mixed with a binding material such as polyethylene particles or the like can be processed in the same manner. Since the final product need not be wrapped for handling, continuous monitering of pressure drop characteristics of the same can be correlated with the rate of feed of the starting material to insure uniform characteristics. The processing techniques for forming staple fiber filter elements and the like result in products having physical and functional characteristics comparable to prior art products, but requiring approximately 20-30 percent less material.

This application is a continuation-in-part of copending applications Ser. Nos. 351,162 and 502,250, filed Mar. 11, 1964, and Oct. 22, 1965, respectively, application Ser. No. 351,162 in turn being a continuation-in-part of applications Ser. Nos. 306,343 and 343,463 filed Sept. 3, 1963, and Feb. 10, 1964, respectively, application Ser. No. 502,-250 also being a continuation-in-part of aforesaid application Ser. No. 351,162 as well as application Ser. No. 458,050 filed May 24, 1965, this latter application being a continuation-in-part of aforesaid applications Ser. Nos. 306,343 and 343,463 as well as applications Ser. Nos. 351,-161 and 392,014 filed Mar. 11, 1964, and Aug. 25, 1964, respectively, application Ser. No. 458,050 now being Patent No. 3,217,715 and applications Ser. Nos. 306,343; 343,463; 351,161; and 392,014 all having been abandoned but with the present application having the priority thereof with respect to common subject matter.

This invention relates generally to processings of making stable elongated bodies, and is particularly concerned with making bodies of such type that are suitable for use as smoke filters.

In making the more conventional type of smoke filters such as used in cigars, cigarettes, or the like, cellulose acetate tows are normally used. These tows are shaped and then treated such that the fibrous constituents thereof are joined together to provide a stable element at least when an overwrap is applied peripherally thereof. Frequently, however, such filter elements are formed from staple or discontinuous fibers in contrast to continuous filaments of the tow-type. Additionally, more recently cigarette filters or the like have been formed by bonding particulate filtering material such as activated carbon particles to each other in the manner described in aforesaid Patent No. 3,217,715. Ordinary techniques for making any of the foregoing filter elements suffer from various disadvantages. The instant invention is concerned with a "universal" method for making such articles which method has various advantageous properties when compared with prior art techniques depending on the particuarly starting material.

The term "continuous filamentary tow," as used in this specification and the appended claims, is intended to define a material such as that which results when filaments extruded from a plurality of spinnerets are brought together and combined to form a continuous body of fibers randomly oriented primarily in a longitudinal direction. In such a tow, the filaments are generally longitudinally aligned in substantially parallel orientation, but include crimped portions which may form short sections running more or less at random in non-parallel diverging and converging directions.

Continuous filamentary tows of plasticized cellulose acetate fibers as well as various other plastic materials such as polyethylene, polypropylene, nylon and the like have been used heretofore in the manufacture of smoke filters for cigarettes, cigars and the like. Although the process of this invention is applicable to the various filamentary materials of this type, since plasticized cellulose acetate is the most common plastic used in the manufacture of cigarette filters, the specification hereof will be generally set forth in terms of this material. However, it is to be understood that the instant inventive concepts are not to be limited to this preferred embodiment.

Generally, the fibers of a cellulose acetate tow merging from the spinneret are bunched together to form a "raw tow" which is collected into a bale for subsequent processing. Such processing usually involves, in addition to unwinding of the "raw tow," spreading apart of the fibers to provide a relatively thin layer of the same, tensioning of the fibers to render the crimp of uniform character, impregnating the fibrous layer with plasticizer to bind adjacent fibers together, and gathering the "bonded" layer through a suitable funnel or the like to form a treated cylindrical tow which is overwrapped in a suitable paper to produce a stable elongated element. This overwrapped rod is then generally severed into segments which are cured and later cut into substantially equal size filter plugs to be secured to a cigarette or the like by a "tipping" overwrap in a well-known manner. The "curing" procedure has ordinarily been commercially effected heretofore by either heating the paper-covered segments in an oven to allow the plasticizer to permanently bond the tow fibers together, or merely by permitting the segments to age for an extended period of time in an unheated condition.

Although satisfactory cigarette filters utilizing the processing techniques described above have been produced, various disadvantages are inherent in such prior operations:

(1) Since the filamentary tow is generally not self-sustaining, it is necessary with prior art techniques to overwrap the same with a suitable paper to facilitate further handling and processing of the filter elements. Such a procedure is relatively expensive and produces a product, the pressure-drop and various other characteristics of which cannot be continuously monitored because of the paper overwrap. It is therefore generally necessary to remove samples from the processing line at spaced intervals for such testing. However, with a testing procedure of this type, it can be readily seen that relatively large quantities of unsatisfactory products can be produced while the sample is being tested, and this can result in a substantial loss of time and material before adjustments can be made in the machinery to correct the deficiencies.

(2) The necessity of a paper overwrap to produce stability renders the severing process not completely satisfactory since the material being cut is not of a substantially uniform character, but rather includes materials of different characteristics, i.e., paper and tow, whereby non-uniformity in the product results and relatively high wear on the cutter or knife edges is encountered.

(3) Since the continuous filamentary tows manufactured according to the prior art overwrap techniques require a paper overwrap to maintain dimensional stability, their subsequent use is limited generally to cigarette filters, the overwrap preventing certain other applications of the product with which the paper interferes.

(4) Since the product is overwrapped with such techniques, an operator cannot examine a rod as it is produced to determine whether or not the plasticizer has been unevenly applied and/or distributed. The rod is covered with paper as cured and those defects known in the trade as "soft sides" and "worm holes" do not become apparent for convenient observation so as to permit immediate correction of the deficiency. Additionally, since the produce is not finally cured as produced, but instead, must await separate final curing, some of the defects do not become apparent on the production line, as such.

(5) Also, since the products must be cured between high speed production thereof and their ultimate use for example in a cigarette, the prior techniques do not readily lend themselves to automatic material handling arrangements such as, for example, pneumatic conveyors delivering the products from the filter production line directly to the cigarette machine.

Suggestions are found in the prior art for the production of substantially stable tow products, including cigarette filters which do not require in overwrap, but these suggestions each have inherent disadvantages. In general, prior art attempts in this direction have either been commercially undesirable from the standpoint of increased processing costs, decreased product utility or reduced functional efficiency and thus, such suggestions have not gained commercial acceptance by the industry. More specifically, with the prior overwrap techniques as well as with prior stable rod techniques, the filamentary tow is pulled through the various processing devices. This pulling results in an undesirable tension on the individual filaments and can provide the product with further dimensional instability whereby changes in size, shape and functional characteristics can be experienced during the curing operation and even during subsequent handling in use. Moreover, relatively uneven elongation of the fibers in the filamentary tow can be caused by the pulling tension on the same during feeding, particularly since the material is generally quite soft and pliable during processing. Thus, once again, uniform functional properties cannot easily be realized at least at very high speeds with such procedures. With other prior stable rod techniques bonding of the filaments has not been completely satisfactory because the setting or curing steps have failed to evenly and uniformly affect the overall cross-section of the elongated element whereby insufficient hardness and undesirable pressure-drop characteristics have been encountered in many instances. In this regard, previous attempts to carry, rather than pull, the filamentary tow through the processing stations have been coupled with unsatisfactory heating and curing techniques, e.g., reliance on heat conducted by the carrying means to the tow therewithin resulting in insufficient and uneven heating throughout the cross-section of the tow, whereby, although certain disadvantages were removed, other undesirable features were introduced.

It can be seen that some of the same disadvantages inherent in present techniques for the manufacture of tow-type filter products or the like are equally applicable to the production of filter elements utilizing staple fibers, although to some extent, the considerations are different. Since the staple fibers are discontinuous in nature, some difficulty is encountered in handling the same due to their discrete nature. If the fibers are exceedingly short, proper porous matrix as required in order to provide a labyrinth of smoke passages for use in a cigarette filter or the like is difficult to produce. In order to provide some stability in a continuous system, the processed staple fibers are ordinarily immediately wrapped in paper or the like to facilitate handling of the same. In any event, with presently available procedures, products having desired characteristics as well as satisfactory pressure drop and density require an undesirably high quantity of material thereby increasing their cost.

Particulate filtration material such as activated carbon or the like also provides certain processing problems in handling of the same and especially when a stable element is to be formed therefrom at high speeds for commercial purposes.

The term "stable" as used herein and in the appended claims with reference to the products of this invention shall be understood to be relative and although, in most instances, the products hereof do not need overwrapping to render them self-sustaining, in some instances, overwrapping is desirable for ease of handling or for special applications. Prior art methods for forming filter elements and the like with particulate filtering materials ordinarily either included the same as an additive in a tow or staple fiber-type product or produced a chamber between two more conventional filter elements for carrying the loose filtering particles. However, such techniques were not usable to produce a "bonded" construction wherein substantially the entire filter body was particulate in nature.

It will be understood that although the instant inventive concepts, as set forth hereinafter, are particularly adapted for forming filters entirely of filamentary tow, entirely of staple fibers or entirely of particulate filtering material, they are likewise applicable to any combination of the starting materials. However, for simplicity the specification hereof will generally be set forth in terms of the various species individually.

While the various techniques and disadvantages of the same described hereinabove are believed to be representative of the manufacturing methods in most widespread use at the present time, it is to be understood that the foregoing is not intended to be comprehensive and, by contrasting the instant inventive concepts with prior art procedures, other undesirable features inherent in the latter will be readily recognized.

Bearing in mind the foregoing, a primary object of the present invention is the provision of stable elongated elements which in themselves are free from the various disadvantages noted above, and which are manufactured utilizing techniques not subject to the drawbacks of previously utilized procedures.

More specifically, it is an important object of the present invention to provide techniques for the manufacture of a smoke filter structure having various functional characteristics such as uniformity, ease of handling and testing, filtration efficiency, etc., which are superior to products now available on the commercial market. Further in this regard, it is a basic object of the instant invention to provide specific procedural steps to be utilized in the method for fabricating stable continuous elements requiring less material than utilized heretofore for similar products in some instances, and, in any event, in a manner which is simple and inexpensive as well as reliable and efficient at high speeds. Accordingly, the present invention is concerned with providing various elongated elements, and in particular, smoke filter rods that can be segmented for use as cigarette filters, cigar filters, or the like, in a continuous, commercially desirable manner.

Consistent with the above, it is an important object of the present invention to provide a smoke filter wherein the raw material need not be pulled through the various processing stations as with most prior tow-processing procedures, but rather, wherein the material, whether it be continuous as with a tow, elongated as with staple fibers or particulate as with activated carbon, is carried, substantially in the absence of any tension, from one treating apparatus to the next, by a continuous surface through which the material can be directly processed to form the final product with a minimum of disturbance. In effecting this result, a significant feature of the instant inventive concepts is the utilization of an endless belt which is continuously orbited through certain treating zones. The belt is flexible whereby it can be utilized to form the material into a desired shape and the belt is also porous, at least throughout a portion of its length, whereby various gaseous materials such as steam and air can be passed directly into the material being processed while the same is confined and carried in a continuous manner by the belt and without the steam or air being hampered or restricted by the belt in its travel to and through the material being processed. In this regard, the term "porous" as used herein and in the appended claims relating to the belt and to the nature of the product, is to be understood in the sense of "pervious," that is capable of passing a fluid or gaseous material therethrough. The belt is of course relatively thin and offers no significant barrier to the passage of the processing fluids therethrough whereas the filter plug or element, being elongated, provides a tortuous path for passage of cigarette smoke or the like resulting in pressure-drop characteristics conventionally encountered with such devices. In fact, with certain of the embodiments hereof, one of the significant advantages is the ease with which pressure-drop characteristics may be modified.

As mentioned above, one of the primary objectives of this invention is the provision of continuous elements which are stable and self-sustaining whereby the necessity for overwrapping the same to insure dimensional stability and facilitate further processing and handling is obviated although this invention is not necessarily limited to the production of non-wrapped elements. However, when wrapping is avoided, this invention provides, as a separate, but related feature, a method for continually testing the pressure-drop characteristics of the product element and immediately varying the rate of feed of the raw material in response to any changes so-measured whereby substantial uniformity of functional characteristics in the product may be realized.

Along the same lines, it is a significant object of this invention to provide a non-wrapped stable elongated element which is fully cured during a continuous processing technique whereby any defects in the product are immediately observable for correction and whereby the product may be automatically fed to subsequent processing apparatus for their ultimate use.

A further important object of the instant invention, for at least some of the embodiments, is the provision of a stable elongated element, the periphery of which is embossed in accordance with the surface configuration of the endless belt utilized to carry and form the same during the processing of the material. This embossed or textured peripheral surface provides greater peripheral surface area and reduces fraying of the peripheral surface, an undesirable characteristic of many prior art products.

As mentioned broadly previously, another important feature of this invention, at least for certain embodiments thereof, is the provision of a filter element or the like which, for commercially acceptable hardness properties, requires substantially less material than prior art techniques, a saving of 20–30% in material costs being possible over products formed according to presently available procedures without detrimentally affecting other functional characteristics of the product. In this regard, the instant invention contemplates procedures for chopping a filamentary tow to form staple fibers which are fed directly into the forming means in a continuous and commercially desirable manner with the resultant filter element being relatively stable and self-sustaining, having a lower density than prior art filter elements of the same general hardness properties and being otherwise useful in the same manner as staple fiber filter elements produced by prior art methods. It will be seen that the density of the filter plugs hereof is a measure of the amount of material needed, e.g., the amount of cellulose acetate and plasticizer required for a particular volume of product, and thereby a measure of the costs of the same.

Another feature of this invention is the provision of a process which can be operated on a high-speed commercial basis to yield a stable elongated body, such as a filter rod formed predominantly or entirely from suitable particulate material such as activated carbon. The particulate material can take various forms itself. For example, it can comprise a mixture of a desirable filtration material such as activated carbon and a separate thermoplastic binder therefor, or it can comprise a filtration material coated with a thermoplastic material. In fact, the filtration material can be of special type where its own thermoplastic properties are used to advantage. Additionally, although for many applications, thermoplastic binders are preferred, other "fluid-activated" binders such as water-soluble binders as disclosed in our Patent No. 3,318,317 which are "steam-activated" may be substituted therefor. In any instance, the process must be such that it permits the high speed production of stable elongated bodies from the particular material used.

A further important primary object of the present invention is to provide such a process which will not only produce filter rods of the type in question, but which will additionally reactivate any previously activated material used in the rods, such as, activated carbon, or alternatively, which can be used to even initially activate the filtration material, if desired. A very important object hereof is to provide a process conforming with the preceding objects, but which is capable of yielding a smoke filter including an activable ingredient, such as activated carbon, which smoke filter continuously possesses desirable filtration properties over the life of the filter as used in a tobacco product. In this latter regard, it will be appreciated that presently available cigarette filters incorporating some substantial quantity of activated carbon have been found to exhibit somewhat desired filtration properties only for a limited part of their usable life in the normal cigarette. In contrast, a "bonded" filter which has been made according to the process hereof appears to possess substantially better filtration properties and maintain such filtration properties over the entire usable life of the cigarette with which it is associated.

Still further, yet significant and important objects hereof include the following: (a) the provision of such a process which can be carried out with apparatus that is easily attachable to a conventional type of cigarette making machine so as to provide for the formation and wrapping of filter rods constructed by following the process hereof; (b) the provision of such a process which is readily capable of operating with various types of material suitable for filtering purposes and various types of binders thereof; (c) the provision of such a process which is readily adapted to have the treatments made in accordance therewith carried out with available mediums such as steam and air; (d) the provision of such a process which yields a continuously uniform product even when operated at high speeds; (e) the provision of such a process which permits an operator to form a stable elongated body and control the density, porosity and other physical properties thereof, as desired, and with relative ease by mere adjustment of treating controls; and (f) the provision of such a process which can be operated for extended trouble-free periods.

The invention will be better understood and objects other than those set forth above will become apparent when consideration is given to the following detailed description. Such description makes reference to the annexed drawings wherein:

FIGURE 11 is a schematic representation of a technique for producing stable elongated elements of staple fibers utilizing filamentary tow as the initial starting material, certain hidden parts being shown in dotted lines for illustrative clarity and modification of the technique to include an additive material with the staple fibers being shown schematically also in dotted lines;

FIGURE 12 is an enlarged end view of a filter plug formed according to the process of FIGURE 11;

FIGURE 13 is a graph comparing the pressure drop versus weight characteristics of a product prepared according to the process of FIGURE 11 with a more conventional filter element;

FIGURE 14 is a schematic representation of a procedure for producing stable elongated elements according to the instant inventive concepts from a substantially particulate starting material such as activated carbon;

FIGURE 15 is a schematic illustration of the particulate material dispensing station of the system of FIGURE 14;

FIGURE 18 is an enlarged longitudinal cross-sectional view through the steam treating station of the system of FIGURE 14;

FIGURE 19 is a longitudinal cross-sectional view through the cooling station of the system of FIGURE 14;

FIGURE 20 is an enlarged schematic view showing respectively in FIGURE 20(a), a section through the belt of the system of FIGURE 14 before the same enters the steam treating station, and in FIGURE 20(b), a section through the belt of the system after the same has passed at least partially through the steam treating station;

Figure 22:
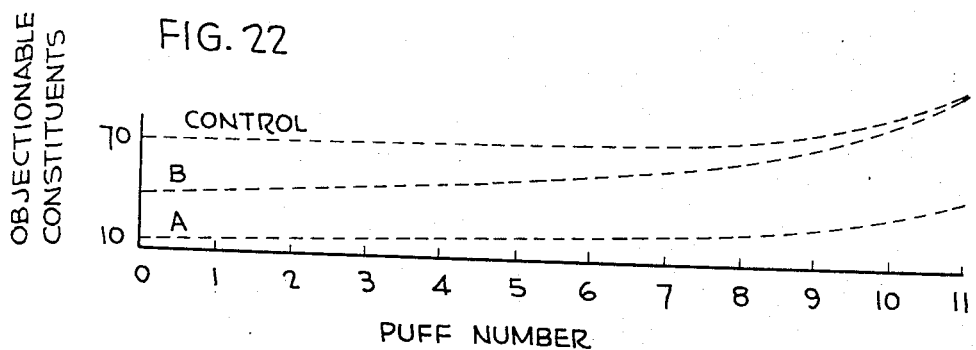

FIGURE 21 is an enlarged perspective view of the vacuum station of the system of FIGURE 14; and FIGURE 22 is a graphic presentation showing the relationship between the objectionable constituents of (a) the gas output or phase of the tobacco in a cigarette, (b) the gas output or phase of a filter associated with such tobacco in a cigarette and made in accordance with this invention, and (c) the gas output or phase of a filter associated with such tobacco in a cigarette and containing loose activated carbon particles.

Like reference characters refer to like parts throughout the several views of the drawings.

Before proceeding to describe the various embodiments hereof, it should be pointed out that the specific devices shown in the drawings are merely illustrative of preferred embodiments of processing apparatus. In some embidiments, different equipment is shown for effecting basically the same processing step. This merely emphasizes the aforementioned fact that the particular arrangement and construction of the apparatus utilized for practicing the instant inventive techniques is not to be considered as critical unless otherwise so-stated.

Referring now to the drawings in general, and more particularly to FIGURES 1 to 10, one embodiment of a technique for producing stable elongated elements according to the instant inventive concept from continuous filamentary tow, wherein the tow remains at least substantially continuous in nature throughout the length of the final product, is designated generally by the reference numeral 20. While any of the filamentary materials commonly used for producing elongated bodies such as filter rods and the like may be processed in accordance with this invention, such materials including the polyolefins, e.g., polyethylene, the polyamides, e.g., nylon, the polyesters, e.g., polyethylene terephthalate and the like, most products of this type are formed from cellulose acetate tows and this embodiment of this instant invention will therefore be generally described with relation thereto. However, it is to be understood that similar products could be produced utilizing other materials in their entirety, or mixtures of such other materials with cellulose acetate. The use of materials other than cellulose acetate would necessitate only slight modifications in the processing techniques which would be obvious to those with ordinary skill in this art.

In the following description, however, it will be assumed that a continuous filamentary tow 22 has been formed from spinneret devices by any of the established techniques widely used in the industry today for formation of "cigarette filter" tows, and that the tow 22 has been stored such as in a bale 24 or the like from which it can be withdrawn as desired for the further processing now to be described. Such a tow is generally referred to as a "raw" or "untreated" tow, and, as is well known, the fibers thereof are normally crimped and unbonded.

Figure 2:
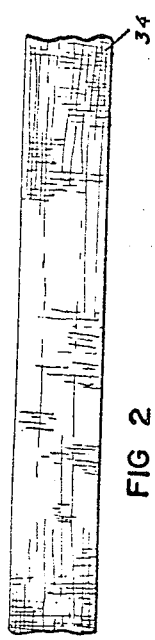
FIGURE 2 is an enlarged fragmentary, plan view taken substantially on line 2—2 of FIGURE 1 and showing a portion of the endless, flexible, porous or pervious belt utilized for forming and carrying the tow material through the various processing stations.
Figure 1:
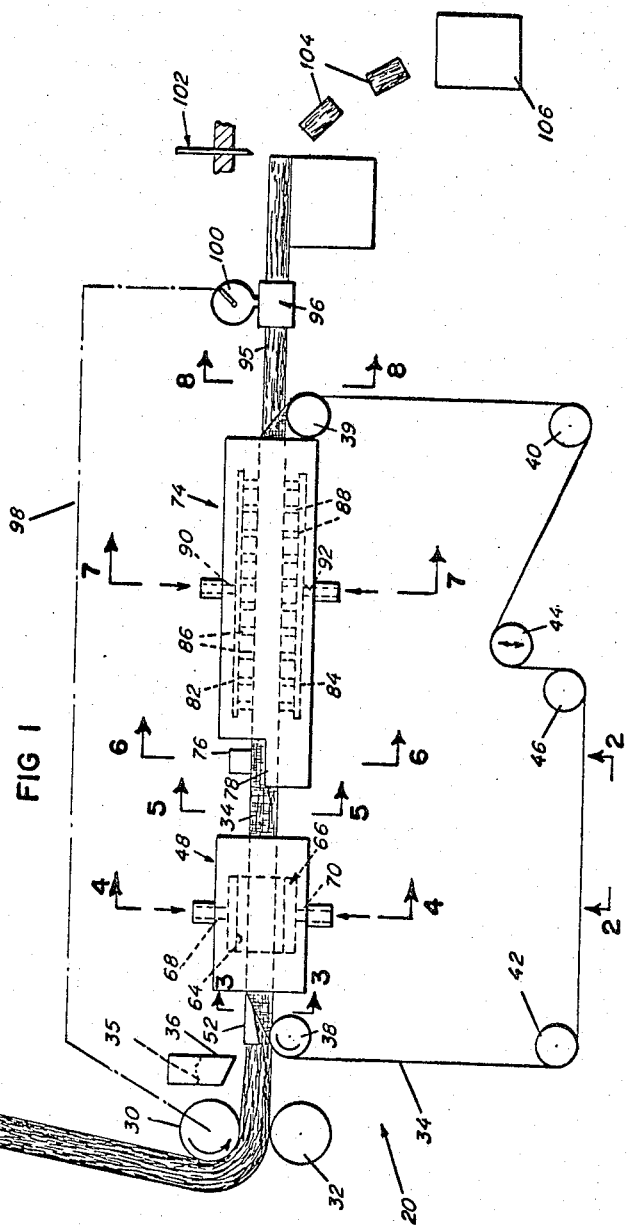
FIGURE 1 is a schematic representation of one technique for producing stable elongated elements from filamentary tow starting materials in accordance with the instant invention, certain hidden parts being shown in dotted lines for illustrative clarity.
Figure 3:
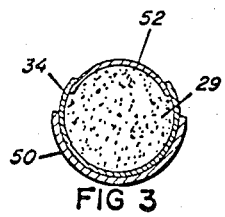
FIGURE 3 is an enlarged, transverse cross-sectional view taken substantially on line 3—3 of FIGURE 1 and showing the initial formation of the belt and the guiding of the continuous filamentary tow thereinto.

Known techniques can be initially followed in carrying out the instant invention, and as shown in FIGURE 1, the raw tow 22, in its crimped form, is passed through a conventional banding device 26 which comprises multiple jets disposed to blow air under pressure against the tow so as to separate the individual fibers thereof. The banded tow 27 may then be passed between pairs of rollers (not shown) to render the crimps therein of uniform character, following which the material passes through another banding device (not shown) similar to the device 26, which may be utilized to spread the tow into a relatively thin filamentary layer.

As shown in FIGURE 1, the filamentary layer is then passed through a plasticizing device 28 wherein a suitable plasticizer such as triacetin, triethyl citrate or the like is sprayed by suitable jets onto one or both sides of the filamentary layer to form a plasticized tow 29. The quantity of plasticizer may vary, although the instant invention requires no more than, and frequently less than prior art techniques.

Any conventional feeding means such as the pair of rollers 30, 32 may be utilized to deliver the plasticized tow 29 to the endless belt 34 to be described in more detail hereinafter. Of course, it is to be understood that at least one of these rollers 30 must be driven to effect the withdrawal of the "raw" tow 22 from the bale 24 and the feeding of the same to the belt 34 for carrying through subsequent processing stations.

The tow speed can be sufficiently great to provide satisfactory commercial production rates. Speeds of up to 200 meters per minute have been utilized with acceptable product characteristics. Of course, the feeding rate must be correlated with the capacities of the various precessing stations to insure that the resultant elements will have satisfactory properties. Such correlation can be readily accomplished by those with ordinary skill in the art.

If desired for special functional characteristics, an additive 35 may be substantially uniformly dispersed across at least the major portion of the width of the relatively thin layer of plasticized tow 29 by merely feeding the same from a dispensing means such as shown in dotted lines at 36 following the feeding roller 30. Such additives may be in the form of a liquid or in the form of a particulate material and may serve to modify the structural or functional properties of the final product. For example, various sorbent materials may be included to improve the filtration effected by the final product if the same is to be used as a cigarette or industrial filter. Exemplary of such materials are activated carbon, silica gel, alkali metal aluminosilicates such as Molecular Sieves sold by Linde Company, a Division of Union Carbide Corporation, sucrose, activated alumina, volcanic ash, granular calcium carbonate, granular sodium carbonate, fuller's earth, magnesium silicates, asbestos powder, metallic oxides such as iron oxide and aluminum oxide, metal treated carbon and the like. Additionally, where porosity or strength properties are a major consideration, metal fibers or even fibrous carbon can be included. Moeover, taste modifiers such as menthol or other similar materials may be incorporated for obvious purposes. Additionally, certain particulate resinous materials such as finely divided polyethylene or polypropylene may be included to improve the binding characteristics as well as the filtration properties of the final product. Mixtures of the above materials are also contemplated. Although it is important to recognize that while the additives and/or fillers listed above can be used if a particular effect is desired, they must be maintained in minor proportions in the overall construction, generally not more than about 30 percent by volume, if a structure having the basic characteristics of a continuous filamentary tow is desired.

The endless, flexible, porous belt 34 is utilized to define a continuous material-forming and carrying surface and is orbitally trained about a group of path-defining rollers 38, 39, 40 and 42, at least one of which is driven by any conventional means (not shown). Additionally, a pair of tensioning rollers 44, 46 are included in the path of travel of the belt 34, the roller 44 being adjustable to facilitate maintaining a desired tension on the belt.

The preferred embodiments of this invention contemplates using a woven nylon belt preferably having a porosity such that the various gaseous mediums, e.g., steam and air, to be utilized in treating the material therewithin in the processing stations to be described in more detail hereinafter, can pass through the belt and actually penetrate the material for optimum and substantially uniform results throughout the entire cross-section of the material. Preferably, of course, the pores in the belt are smaller than any of the material although the housings of the processing stations may assist in supporting the belt to retain the material therewithin.

If desired, the belt may be provided with a lubricating or wear-resisting coating such as polytetrafluoroethylene or a silicon emulsion. Such materials improve the water resistant properties of the belt as well as preventing adhesion between the belt fibers and the material carried thereby.

Referring now more particularly to FIGURES 1 to 3 and 9, the plasticized tow 29, with or without additives, is fed onto the belt 34 by the rollers, 30, 32 in advance of a steam-treating station 48. The belt 34 is initially formed around the tow 29 by an elongated, open arcuate trough 50 (not shown in FIGURE 1 for illustrative clarity) and the tow 29 is guided into the belt 34 by an elongated, concavely curved tongue 52 fitting within the trough 50 and the belt 34. Portions of the steam-treating station 48 define an elongated bore 54 seen particularly in FIGURE 9 which receives the belt 34 and the tow 29 from the trough 50 and the tongue 52. The bore 54 has a circumference so dimensioned with respect to the width of the belt as to form the belt into a substantially closed cross-section as it moves through the bore. The curve of the tongue 52 constantly decreases in cross-section and the smaller end of the tongue extends into the bore 54 as will be seen in FIGURE 9 until the belt 34 is substantially completely closed about the tow 29 to insure that the tow is guided into the closed belt. However, the tongue can terminate at the entrance of the bore and the belt can there close. This forming of the belt and thereby the tow is accomplished at least partially in the initial portions of the steam-treating station 48 for convenience, but it will be understood that separate means may be included to effect this function, if desired.

Figure 4:
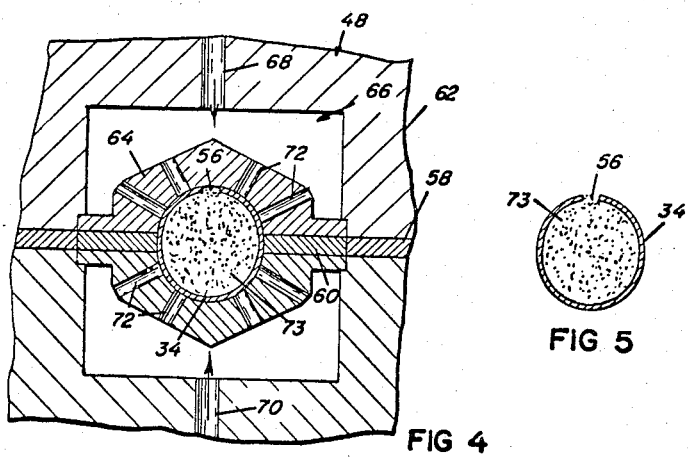
FIGURE 4 is an enlarged, fragmentary, transverse cross-sectional view taken substantially on line 4—4 of FIGURE 1 and illustrating the confined zone wherein steam treatment of the material is effected.
Figure 5:
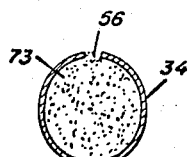
FIGURE 5 is an enlarged, transverse cross-sectional view taken substantially on line 5—5 of FIGURE 1 and showing the somewhat elongated or elliptical shape of the belt and the material therein as the same leaves the steam-treating station according to the illustrated embodiment.

Since there is some difficulty in forming the belt around the tow in a manner to provide a perfect meeting of the longitudinal edges of the belt, a longitudinal seam 56 will ordinarily result during this initial forming operation. In order to remove this seam by a pressing operation to be explained in more detail hereinafter and compensate for the change in cross-sectional shape of the tow resulting from the seam-removing operation if necessary, the tow may initially be formed into a slightly vertical, elongated or substantially vertical, elliptical shape as shown particularly in FIGURES 4 and 5. It is to be understood that this elongated shape and the seam resulting between the longitudinal edges of the belt are exaggerated in the drawings for illustrative convenience. In this regard, shims 58, 60 are shown in the housing 62 and insert 64 of the steam-treating station 48 as illustrated in FIGURE 4 to emphasize the slightly elongated construction of the confined area within the insert 64 which receives the belt 34 and the tow therewithin as the same passes through the steam-treating station. However, an elliptical bore can be used in insert 64. In either event, the width of the belt 34 is slightly less than the circumference of the elliptical confined area in the insert 64 whereby the longitudinal edges of the same will be slightly spread apart to facilitate the later seam-removing operation. Additionally, it should be emphasized that the elliptical bore in the steam-treating station is not necessary in many instances whereby the bores in the steam-treating and air-cooling stations may be identical in configuration. Thus, further discussion herein of the "elliptical" steam-treating bore and "reshaping" of the cross-sectional shape of the tow resulting from the seam-removing operation will be understood to relate to only one embodiment of the basic concepts hereof, although the invention is not necessarily limited thereto.

The insert 64 is carried within an elongated chamber 66 which receives steam from a source of the same (not shown) through a pair of oppositely disposed conduits 68, 70. A plurality of radially spaced passageways 72 are defined in the insert 64 communicating between the chamber 66 and the central area in which the belt 34 and tow therein are confined. Thus, steam under pressure is passed continuously and directly through the porous surface of the belt 34 and into the tow as the same is carried by the belt through the steam-treating station to produce a steam-treated tow 73 of generally elliptical cross-section and having the longitudinal seam 56. In this manner the bonding constituents of the tow are activated by the steam while the tow is in a relaxed or substantially tensionless condition since it is being carried by the belt, rather than pulled through the processing station by some forwardly-positioned pulling means.

The steam requirements can be varied by those with ordinary skill in the art to produce the desired activation of the bonding constituents of the tow, but as will be seen from the subsequent examples, it has been found that with a tow feed rate of approximately 117 meters per minute and a tow cross-section of approximately 0.5 cm.$^2$, approximately 24 pounds per hour of steam provides satisfactory results.

Figure 6:
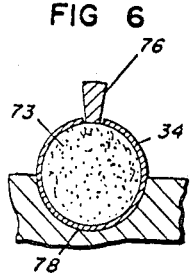
FIGURE 6 is an enlarged, fragmentary, transverse cross-sectional view taken substantially on line 6—6 of FIGURE 1 and illustrating the removal of the seam from the steam-treated intermediate element and the simultaneous reforming of the same into its substantially cylindrical final cross-sectional shape.

Referring now particularly to FIGURES 1 and 6, the belt 34 with the steam-treated tow 73 therein moves from the steam-treating station 48 toward the cooling station 74. However, before entering the cooling station 74 a presser foot 76 engages the longitudinal seam 56 between the edges of the belt 34 to remove the same from the tow. The pressure foot 76 is disposed in spaced relationship to an arcuate trough 78 formed at the entrance to the cooling station 74 so that the pressure resulting from engagement with the foot 76 simultaneously reforms the tow 73 into a substantially circular cross-section as will be seen in FIGURE 6 which corresponds to the desired cross-section of the final product. It is to be understood, once again, that the elements are somewhat exaggerated for illustrative purposes and that the presser foot 76 need not be, for example, any more than approximately ⅛″ in cross-section under ordinary circumstances.

Figure 7:
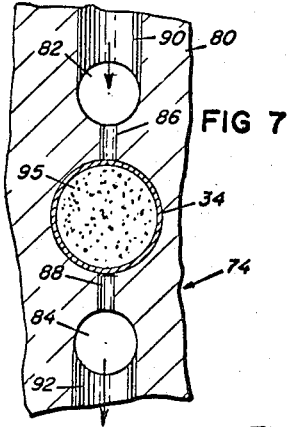
FIGURE 7 is an enlarged, fragmentary, transverse cross-sectional view taken substantially on line 7—7 of FIGURE 1 and showing the confined zone wherein air cooling of the material is effected.
Figure 8:
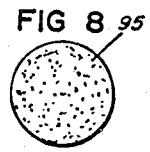
FIGURE 8 is an enlarged, transverse cross-sectional view, taken substantially on line 8—8 of FIGURE 1 and illustrating the final circular cross-sectional shape of the stable, enlongated product.

The housing 80 of the cooling station 74 defines a confined area in the form of an elongated cylindrical bore of a circular cross-section substantially corresponding to that of the final product as will be seen in FIGURE 7. The circumference of the confined area in the cooling station 74 is substantially equal to the width of the belt 34 whereby the longitudinal edges of the belt substantially meet during passage through the cooling station. It will be noted that the cooling station 74 is substantially longer than the steam-treating station 48 since it has been found that the production speed of the apparatus is dependent on the cooling capabilities in this station.

In order to provide for the most efficient cooling characteristics the station 74 is provided with a pair of elongated plenum chambers 82, 84 which communicate with the confined area through which the belt 34 and the tow therein passes, by means of a plurality of longitudinally spaced passageways 86, 88. The upper plenum chamber 82 receives air or other inert cooling gas, preferably under pressure, through a conduit 90 from a source (not shown). Similarly, a conduit 92 communicates with the plenum chamber 84 for removal of the air, vacuum being supplied at this point, if desired. In any event, it will be seen that the cooling gas is actually forced through the steam-treated tow 73 as the same is carried by the belt 34 through the cooling station 74. Once again, the drying of the tow and the setting of the bonding constituents of the same take place substantially in the absence of any tension.

As in the case of the steam requirements, the cooling gas may be varied within the skill of the ordinary artisan to insure that the desired characteristics in the final product will be obtained. It has been found, however, as will be seen from the subsequent examples, that with a tow feed and cross-section such as described with regard to the steam requirements, approximately 19.5 cubic feet per minute of air at room temperature, e.g. 70 to 85° F., and 26½ p.s.i.g. produces satisfactory results.

At the cooling station, the gas is passed into and through the formed material for essentially two purposes, namely, to cool and set or cure the previously activated bonding constituent and to remove excess moisture from the material. When the steam is passed to and into the tow to activate the bonding constituent, there is a tendency for the same to condense thus giving the product excessive moisture. Moreover, the steam expedites the action of the plasticizer on the tow, i.e., it activates the bonding constituent so as to cause instantaneous bonding of the plasticized material. Thus, while the steam serves to efficiently and uniformly activate the bonding constituent at high speeds, it has been found necessary at the cooling station to not only deactivate the bonding constituent but to also remove the excess moisture. In fact, the steam preferably causes full utilization of the plasticizer and the cooling gas then basically functions to remove excess moisture in the tow resulting from condensation of the steam and rigidify the rod being produced. Therefore, the terminology "set the bonding constituent" as used in the specification and claims is to be understood as including the operation just described when there is no plasticizer remaining in the tow to deactivate after the steam treatment.

With respect to the operations at both the steam treating and cooling stations, it is significant to note that the steam and air respectively pass to and into the tow without experiencing any significant or substantial flow resistance from the belt. The belt is thus sufficiently porous, by virtue of its open mesh characteristics, to effectively permit vapor and gas passage therethrough without obstruction. This is to be distinguished from a fabric or closely woven belt wherein heat may be conducted therethrough, but obstruction and resistance is encountered in the passage of any gas or vapor therethrough.

The product 95 is peeled from the belt 34 as the same leaves the cooling station 74 and the belt 34 is substantially flattened and continuously orbited over the path-defining and tensioning rollers 39, 40, 44, 46, 42 and 38 to receive additional plasticized tow 29 in advance of the steam-treating station 48. Thus, uninterrupted processing of the tow is effected by forming and carrying the same in the belt 34 with substantially no tension on the tow during the steam and cooling procedures.

The product 95 is in the form of a stable, self-sustaining, elongated element shown illustratively as substantially circular in cross-section although it is to be understood that similar techniques could be utilized for the production of elements of substantially any other desired cross-section. The resultant product 95 has the individual filaments of the tow bonded to each other at spaced points to form a porous mass which, when used as a smoke filter, defines a plurality of tortuous paths for the passage of the smoke whereby effective filtration can be realized. The peripheral surface of the product 95 is textured as a result of an embossing operation produced by the surface configuration of the belt 34. The textured or embossed surface functions to significantly reduce or prevent fraying of the individual filaments at the periphery of the product as well as providing the periphery with increased surface area for adhesively securing the same to a paper overwrap such as the "tipping" overwrap conventionally used in the formation of filter cigarettes or the like in contrast with the relatively smooth peripheral surface resulting from various prior art attempts at producing self-sustaining elongated bodies. It will be readily seen that the particular design of the embossed surface may be varied at will by merely utilizing a belt having the desired surface configuration.

Although a "tipping" overwrap is conventionally utilized to attach a filter element such as the product of the instant invention to a tobacco section of a cigarette or the like, such an arrangement is to be distinguished from the utilization of a paper overwrap for the elongated element itself to provide dimensional stability. Such prior art paper overwraps are necessary during the processing cycle whereby, as pointed out earlier, pressure-drop characteristics of the product cannot be monitored without removing sample portions from the production line. In contrast, since there is no overwrap utilized in the production of the continuous element according to the instant invention, the product 95 can be passed through a pressure-drop measuring means 96 of conventional design in order to continuously and directly monitor this property of the product without removing samples at selected intervals as has been necessary heretofore. By this technique, any conventional means shown schematically as a mechanical linkage by the dashed lines 98 may be utilized to translate the pressure-drop reading illustratively shown on the gauge 100 into a control for the rate of feed of the tow 29 by, for example, the driven roller 30. In this manner, feeding of the tow 29 may be automatically and continuously varied in response to any changes in pressure-drop of the product 95 whereby substantially constant pressure-drop characteristics may be maintained. In other words, if the pressure-drop of the product is found to be above the optimum value indicating that the product is too dense, the rate of feeding the tow into the steam-treating station 48 can be automatically reduced to compensate therefor. Similarly, if the pressure-drop characteristics are below the desired optimum, the tow feed can be increased. Although the means for effecting this continuous measuring of the pressure-drop properties of the product, and controlling the feed of the tow in response thereto, have been shown schematically in the drawings, actual mechanical and electrical devices to effect these operations can be readily designed by those with ordinary skill in the art.

The product 95, after having its pressure-drop properties measured, if desired, can then be severed by any conventional means shown schematically at 102 into individual segments 104 of at least substantially equal predetermined lengths for collection as in the collecting means 106. Once again, the continuous nature of the process can be retained by causing the severing means 102 to move with the product 95 in a well-known manner. If the product is to be utilized as a smoke filter, the segments 104 are generally cut into lengths equal to any multiple number of individual filter plugs which may be later subdivided as is conventional in cigarette manufacture. The characteristic all-tow structure of the preferred product of the instant invention facilitates the severing technique in that it is unnecessary for the knife blade to engage materials of different characteristics such as the paper overwrap and tow core generally encountered in prior art products.

Figure 10:
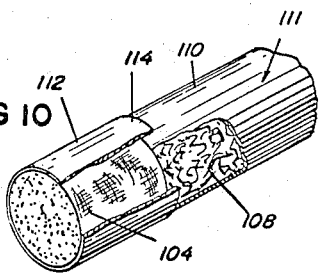
FIGURE 10 is an enlarged, fragmentary, perspective view of a cigarette carrying a filter plug made according to the process shown in FIGURE 1, parts being broken away for illustrative clarity.
Figure 9:
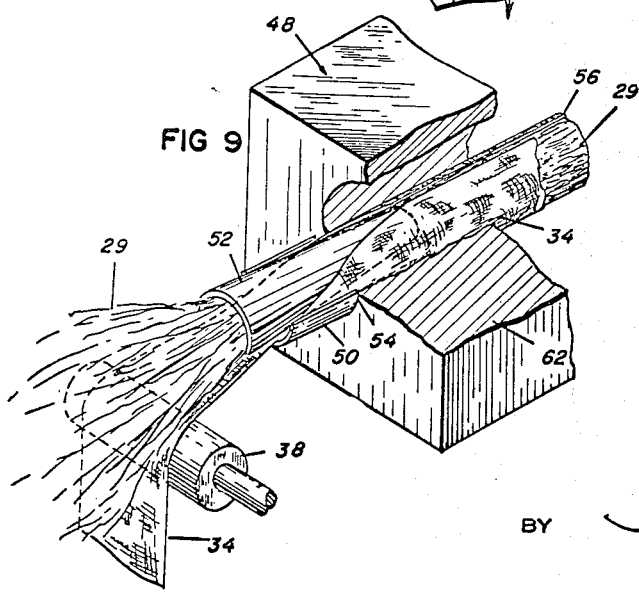
FIGURE 9 is a fragmentary, perspective view of the initial forming of the endless belt and the material therein, parts being broken away for illustrative clarity.
Figure 16:
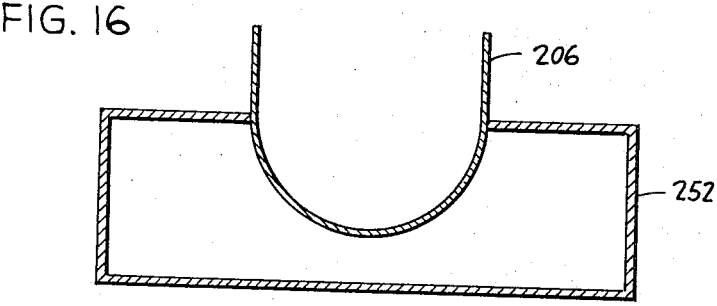
FIGURE 16 is an enlarged transverse cross-sectional view taken substantially on line 16—16 of FIGURE 14 and showing the support of the porous or pervious belt on the vacuum guide preparatory to forming and treating of the particulate material.
Figure 17:
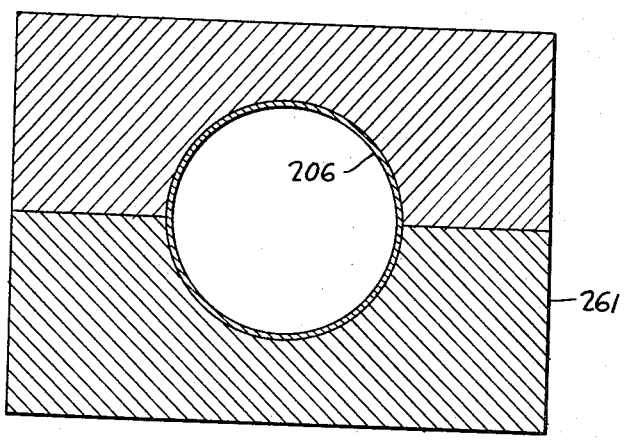
FIGURE 17 is an enlarged transverse cross-sectional view taken substantially on line 17—17 of FIGURE 14 and illustrating the closed nature of the belt as it enters the steam treating station.

The use of a product segment 104 as a cigarette smoke filter is shown in FIGURE 10 wherein a mass of tobacco 108 overwrapped with conventional cigarette paper 110 to form a tobacco section 111 is secured to the filter plug 104 by a conventional "tipping" overwrap 112. Preferably the "tipping" overwrap 112 is adhesively secured substantially uniformly to the embossed peripheral surface of the filter plug 104 and includes an integral extended portion 114 adhesively secured to the cigarette paper 110 at one end of the tobacco section 111. In this manner a single overwrap for the filter plug functions to attach the same to the tobacco section and simultaneously precludes channeling of smoke around the periphery of the filter plug. As explained hereinabove, the embossed periphery of the filter plug 104 improves the bonding properties necessary for adhesively securing the same to the "tipping" overwrap 112 by providing a greatly increased surface area for reception of the adhesive material.

Although the instant inventive concept has been generally described with reference to the production of cigarette filters or the like, it will be seen that the resultant product may have many other uses, both related and unrelated to the smoke filtration of a filter cigarette. For example, the individual segments 104 may be utilized as industrial smoke filters or gas-liquid contact elements whereby the material being processed passes directly through the element as in a cigarette filter or, alternatively, into peripheral contact with a plurality of such elements as in the well-known "stacked columns." Further, the capillary properties of the product of the instant invention may be utilized, for example, in the use of the product elements as ink absorbers within dispensing containers such as the common "felt" marking devices. Other similar applications for such products will be obvious to those with ordinary skill in the art and it is intended that the reference throughout this specification to smoke filters be considered merely as illustrative of the preferred use, rather than as limiting on the instant inventive concept.

In order to further facilitate an understanding of the instant invention the following examples as set forth although it is to be understood that these examples are intended merely as illustrative of preferred processing conditions, and not as limiting.

Example 1

The procedure shown in FIGURE 1 was followed utilizing a tow speed of approximately 117 meters per minute of "raw" cellulose acetate. After banding, approximately 10 percent by weight of the tow of triacetin was sprayed onto the relatively thin layer of filaments and the plasticized tow was formed into a generally elliptical shape of a cross-section of approximately 0.5 cm.$^2$. Steam at a rate of approximately 24 pounds per hour was passed into the plasticized tow in the steam-treating station following which the longitudinal seam formed in the tow was removed by pressing. The tow was cooled by approximately 19.5 cubic feet per minute of air at 75° F. and 26.5 p.s.i.g.

Individual filter rods of approximate lengths of 80 mm. were severed from the continuous product and such rods, as produced, and after 24 and 72 hours of storage were found to have the following weight characteristics and constituents:

TABLE 1

| Control | Weight (gram/10 rods) | Acetate,* Percent | Plasticizer, Percent | Water, Percent | Total, Percent |
|---|---|---|---|---|---|
| As produced | 5.95 | 82.3 | 10.0 | 7.7 | 100.0 |
| After 24 hours | 5.85 | 83.8 | 10.2 | 6.0 | 100.0 |
| After 72 hours | 5.77 | 84.6 | 10.0 | 5.4 | 100.0 |

*Including lubricant.

The above data shows a reduction in water content during storage, but the final moisture can be varied by modifying the characteristics of the cooling station as well as the relative humidity of the storage area.

Comparative test results between the product of the instant invention and ordinary paper overwrapped cellulose acetate rods of the prior art are as follows:

TABLE 2

| Control | Paper Overwrapped Rods | | | Non-wrapped Rods | | |
|---|---|---|---|---|---|---|
|  | Avg. | Max. | Min. | Avg. | Max. | Min. |
| Weight, g./10 rods | 6.5 | 6.7 | 6.4 | 5.85 | 5.95 | 5.75 |
| Pressure-drop inches H$_2$O | 5.3 | 6.1 | 4.2 | 4.8 | 5.1 | 4.4 |
| Circumference, mm | 24.6 | 24.7 | 24.5 | 24.55 | 24.65 | 24.45 |
| Length, mm | 79.7 | 80.4 | 79.3 | 79.7 | 79.8 | 79.5 |
| Hardness | 234 | 259 | 223 | 226 | 233 | 217 |

It will be seen from the above that, in substantially all instances, the non-wrapped rods of the instant invention are more consistent in their properties than the paper over-wrapped rods of the prior art. Other functional characteristics of the non-wrapped rods are at least comparable, and in many instances, improved, over prior art construction.

Example 2

Example 1 is repeated with the dispersion of up to 30 percent by volume of finely divided flake carbon particles utilizing the technique shown at 36 in FIGURE 1. Filtration efficiency of the final product is improved because of the higher sorptive characteristics of the additive.

Referring now particularly to FIGURE 11, a modification of the technique of FIGURE 1 is designated generally by reference numeral 125. In this embodiment, as in the embodiment of FIGURE 1, tow 126 is withdrawn from a bale 128 or the like of the same, banded as shown at 130, plasticized at 132 and otherwise preprocessed as in the earlier embodiment. However, in the modification of FIGURE 11, the tow 126, instead of being fed directly into the steam-treating station, is first fed by rollers 134, preferably through a funnel 136, to a chopper 138 operatively connected to a speed control mechanism shown schematically at 140. The chopper 138 severs the continuous tow 126 into a multiplicity of discrete staple fibers, the length of which depends upon the relationship between the speed of the chopper and the rate of feed of the continuous tow.

A blower is shown schematically at 142 and comprises a housing defining a confined area within which is disposed a fan (not shown) so as to draw an air stream through the confined area creating a vacuum at the entrance 144 and a positive pressure at the exit 146. The staple fibers produced by the chopper 138 are sucked from the chopper through the element 148 which connects the exit of the chopper with the entrance of the blower.

The turbulent air stream created in the blower 142 disperses the staple fibers and carries the same to the exit 146 at which point the air stream containing the dispersed staple fibers is blown through a porous enclosing means in the form of a frusto-conical screen 150, the smaller or outlet end of which feeds onto the porous or pervious belt 152 in a manner similar to the tow feeding arrangement of the embodiment of FIGURE 1. A major portion of the air stream is dissipated through the conical screen 150 as schematically illustrated by the arrows 154, the remainder of the air stream carrying the fibers into the belt 152 and being dissipated through apertures 156 in the initial portion of the steam-treating station 158.

It will be noted that the porous enclosing means is tapered whereby it functions to slow the speed of the staple fibers passing therethrough. Further, the tapered nature of the screen has a tendency to dispose the staple fibers so that the length of at least a predominant portion of them is disposed substantially transversely to the longitudinal axis of the continuous element to be produced therefrom. The porosity of the screen 150 will, at least partially, regulate the amount of air dissipated therethrough and the speed with which the fibers move as they enter the steam-treating station 158, a 100 mesh screen being found preferable for most applications in accordance with the instant invention.

It will be recognized that, at least to some extent, the length of the staple fibers will affect the resultant properties of the product. According to the invention, the fibers can be varied substantially from as little as 1/8 of an inch up to approximately 2 inches, although approximately 3/8 of an inch is preferred. In fact, it is desirable that at least a predominant portion of the staple fibers are slightly longer than the diameter of the finished product so that they will tie-back slightly when they extend substantially transverse to the longitudinal dimension of the finished product thereby improving the interengagement of the fibers.

After the staple fibers have been fed onto the porous belt 152 and the belt is formed about them at the entrance to the steam-treating chamber 158, the remainder of the processing steps hereof are substantially the same as those described with reference to the embodiment of FIGURE 1. Thus, the plasticized cellulose acetate is first treated with steam, the seam produced by the edges of the belt 152 is pressed from the rod-like element produced in the steam-treating station 158 by the presser foot 160, air is passed through the belt and rod in the cooling-station 162, the belt is separated from the elongated product 164 and orbited about the rollers 166, and the continuous element 164 is severed by cutting means shown schematically at 168 to form segments 170 collected as at 172. As measured with regard to the embodiment of FIGURE 1, it is not necessary that the bore of the steam-treating station 158 be elliptical and for most applications, this bore can have substantially the same configuration as the bore of the cooling station 162.

In FIGURE 12, it will be seen that the element 170 comprises a multiplicity of individual or staple fibers 174 generally extending transversely to the longitudinal axis of the element and tying-back slightly to form a multiplicity of contact points at which the staple fibers are bonded to each other to produce a porous matrix providing a labyrinth of smoke passages when utilized as a cigarette filter or the like. The filter element hereof preferably has substantially uniform physical properties throughout any cross-section thereof. As will be shown by the examples hereinafter, the characteristics of a product formed according to this embodiment can be varied substantially while utilizing the same initial tow material by merely varying the feed rate into the chopper means. Additionally, as will also be shown hereinafter, the product has completely acceptable commercial properties, comparable to prior art filter plugs, while utilizing substantially less material, from 20 to 30% less in most instances thereby effecting a substantial saving in material costs.

Thus, while this embodiment preferably utilizes substantially similar forming means to the embodiment of FIGURE 1, it will be seen that the initial processing steps significantly modify the final product. Besides providing a continuous process for the production of filter elements and the like formed of staple fibers wherein the filamentary tow is chopped into the staple fibers and directly fed into the forming means, a technique results which provides significant savings in material utilized.

Of course, while this embodiment has been described particularly with reference to plasticized cellulose acetate, the various other filamentary materials described with respect to the embodiment of FIGURE 1 can be readily substituted therefor with only slight modifications within the skill of the art. Additionally, the tow material can be blended with an additive for special applications. In FIGURE 11, such an arrangement is shown in dotted lines. A roll of additive material, for example, pulp in sheet form is designated by the reference numeral 175 and is fed by rollers 176 into a chopper 178 quite like the chopper 138. The chopped pulp is then drawn through element 180 into a hammermill 182 wherein it is further fiberized to produce relatively fine fibrous material. A blower 184 sucks the fibers from the hammermill 182 and blows the same through conduit 188 into the funnel 136 where they are fed with the tow 126 into the chopper 138.

The quantity of additive material can be varied substantially and with up to approximately a 50/50 blend, the plasticizer on the cellulose acetate tow is generally sufficient to satisfactorily bond the final product. However, if blends having larger quantities of additive material such as 75/25 blend is desired, additional bonding agents may be included such as fibrous or particulate polyethylene or the like. In any event, the use of such additives can further reduce the cost of the final product.

Various pulp materials including kraft pulp, sulphite pulp and alpha pulp fibers can all be utilized as well as numerous other materials including shredded bagasse fibers, cotton linters, wool, glass fibers, fine viscose fibers and other such materials, either alone or in admixture. Thus, the type of additive will be seen not to be critical and the illustrative embodiment disclosed and described in the drawings will be understood as not limiting on the instant inventive concept.

Additionally, while the additive material is preferably one of the above materials, other additive materials may be fed with the chopped tow into the blower 142 or otherwise fed into the belt 152 for particular applications. Such additives may be in the form of a liquid or in the form of a particulate material and may serve to modify the structural or functional properties of the final product. For example, various sorbent materials may be included to improve the filtration effected by the final product if the same is to be used as a cigarette or industrial filter. Exemplary of such materials are activated carbon, silica gel, alkali metal aluminosilicates such as Molecular Sieves sold by Linde Company, a Division of Union Carbide Corporation, sucrose, activated alumina, volcanic ash, sepiolite, granular calcium carbonate, granular sodium carbonate, fuller's earth, magnesium silicates, asbestos powder, metallic oxides such as iron oxide and aluminum oxide, metal treated carbon and the like. Additionally, where porosity or strength properties are a major consideration, metal fibers or even fibrous carbon can be included. Moreover, taste modifiers such as menthol or other similar materials may be incorporated for obvious purposes. Additionally, certain particulate resinous materials such as finely divided polyethylene or polypropylene may be included to improve the binding characteristics as well as the filtration properties of the final product. Mixtures of the above materials are also contemplated. Activated carbon is particularly useful.

Another important feature of the invention is that the starting material, that is, the filamentary tow, need not be highly crimped in order to provide a desirable porous matrix, even non-crimped material being useful. With prior art conventional filamentary tow processing techniques, a relatively small variation in the properties of the product can be achieved utilizing a particular filamentary tow. However, in order to realize significant differences in product characteristics, the starting material, that is, the filamentary tow, must be changed. In other words, a material having a different denier per filament and total denier must be substituted if significant product differences are necessary. However, according to the instant invention, substantial modifications in the product can be effected utilizing the same starting material merely by modifying the rate of feed of the material into the chopper whereby, for example, the pressure drop and weight of the product can be substantially altered with the same basic tow as a starting material.

This great variation is exemplified by the graphic illustration of FIGURE 13 wherein it will be seen that, utilizing the concepts of the instant invention, significant differences in pressure drop and weight can be effected with a particular filamentary tow. For example, it will be noted that utilizing a 2.5 denier per filament tow, with proper modification of the feed rate, etc., according hereto, a pressure drop variation for a 120 mm. sextuple rod of between approximately 9 and 25 inches of water is possible as well as a weight variation for such a rod of from close to 0.5 gram to almost 0.9 gram. A similar significant variation in the properties of a product utilizing a 3.3 denier per filament tow is also shown. In contrast, with prior art techniques, it will be seen that with a particular type of starting material, only a slight variation in pressure drop and weight characteristics can be effected. Thus, if any significant change in the properties of the product is desired, it is necessary modify the filamentary tow utilized as the starting material.

Further understanding of the above will be gained from a review of the following examples wherein, utilizing a particular cellulose acetate tow, a great variation in product characteristics was obtained by modifying the feed rate of the tow into the chopper, the other processing data being similar to that used in Example 1 above.

Reference is first made to Table 3, below, wherein a 2.5 denier per filament, 51,000 total denier, cellulose acetate tow was utilized in the preparation of filter rods having an approximate diameter of 7.9 mm. and a sextuple length of 120 mm.:

TABLE 3

| Example No. | Weight, w/o paper, gm. | Density, gm./cc. | P.D., inches H$_2$O | AFC Hardness |
|---|---|---|---|---|
| 3 | 0.530 | 0.090 | 11.0 | 193 |
| 4 | 0.566 | 0.098 | 12.6 | 197 |
| 5 | 0.624 | 0.108 | 14.5 | 212 |
| 6 | 0.673 | 0.116 | 15.7 | 226 |
| 7 | 0.732 | 0.126 | 18.7 | 241 |
| 8 | 0.767 | 0.132 | 19.7 | 249 |
| 9 | 0.853 | 0.147 | 17.4 | 190 |
| 10 | 0.878 | 0.151 | 17.6 | 194 |
| 11 | 0.910 | 0.157 | 18.1 | 200 |

The term "pressure drop" or "P.D." as used herein, refers to a pressure drop measurement across a filter rod under test. For this purpose, as conventional, a smoke stream through the filter is created having a flow rate of 17½ cubic centimeters per second. Then, through the use of a conventional U-tube containing water, the difference in pressure at the inlet end of the filter and at the outlet end of the filter is measured in terms of inches of water.

The term "AFC hardness" as used herein and in the appended claims, is based on the following test. The testing apparatus is a Model 551 micrometer manufactured by Testing Machines, Inc., Mineola, New York. The micrometer has a dead weight loading of approximately 2½ lbs. with the weight on and exerts a pressure of 7 to 9 lbs. per square inch. After the size and weight are determined on the rods, they are fully cured by placing them in an oven at 110° C. for five minutes, then exposing them to room temperature for another 5 minutes. The micrometer is opened to its stop point of 0.3438 inch. The rod is placed on the lower anvil of the micrometer, seam up, and the upper anvil is then released. The reading is immediately taken after the anvil has come to rest, with no waiting period. This reading is the final diameter of the rod, as compressed by the weight, in inches multiplied by 1000. Commercially acceptable filter rods of 7.9 mm. diameter (0.311 inch) have an AFC hardness of at least 180, preferably in excess of 200.

Referring now to Examples 3 to 6 above, it will be seen that, utilizing the technique of this invention, a filter rod can be produced having an AFC hardness in excess of the commercially acceptable value with a density of less than 0.120 gram per cubic centimeter. Such characteristics are only attainable utilizing the instant inventive concepts, ordinary processing techniques otherwise producing either an unduly low AFC hardness or an unduly high density. The significance of the capability of producing satisfactory hardness with such relatively low density will be readily recognized in that this is an indication of the amount of material necessary for the manufacture of the filter elements.

By further reference to Examples 3 to 8, it will be seen that, by modifying the tow feed rate into the chopper, a great variation in both density, pressure drop and hardness can be attained, the density varying from 0.090 gram per cubic centimeter in Example 3 to 0.132 gram per cubic centimeter in Example 8, the pressure drop varying from 11.0 inches of water in Example 3 to 19.7 inches of water in Example 8 and the AFC hardness varying from 193 in Example 3 to 249 in Example 8. In contrast, Examples 9 to 11 show the production of conventional filter elements utilizing a 2.5/51 cellulose acetate tow, and varying the amount of stretch in the tow from minimum to maximum to thereby obtain the maximum variation in product characteristics. First of all, in each instance, it will be seen that in order to provide an acceptable AFC hardness, relatively high densities are required. Additionally, the variation in the density, the pressure drop and the AFC hardness are relatively slight regardless of the amount of stretch left in the tow.

Similar results can be seen in Tables 4 and 5 hereinbelow wherein 3.3 denier per filament, 44,000 total denier, tow was utilized in Table 4, Examples 12 to 21, and 5 denier per filament, 45,000 total denier, was utilized in Table 5, Examples 22 to 30.

TABLE 4

| Example No. | Weight, w/o paper, gm. | Density, gm./cc. | P.D., inches H₂O | AFC Hardness |
|---|---|---|---|---|
| 12 | 0.518 | 0.089 | 8.9 | 200 |
| 13 | 0.581 | 0.100 | 10.2 | 212 |
| 14 | 0.637 | 0.110 | 11.8 | 233 |
| 15 | 0.695 | 0.120 | 14.1 | 235 |
| 16 | 0.741 | 0.128 | 15.5 | 248 |
| 17 | 0.776 | 0.134 | 16.9 | 259 |
| 18 | 0.861 | 0.149 | 20.9 | 271 |
| 19 | 0.667 | 0.117 | 9.7 | 165 |
| 20 | 0.712 | 0.123 | 10.8 | 189 |
| 21 | 0.770 | 0.133 | 11.9 | 185 |

TABLE 5

| Example No. | Weight, w/o paper, gm. | Density, gm./cc. | P.D., inches H₂O | AFC Hardness |
|---|---|---|---|---|
| 22 | 0.511 | 0.088 | 5.4 | 202 |
| 23 | 0.571 | 0.099 | 6.2 | 215 |
| 24 | 0.630 | 0.109 | 7.0 | 215 |
| 25 | 0.674 | 0.116 | 8.1 | 222 |
| 26 | 0.714 | 0.123 | 8.7 | 239 |
| 27 | 0.772 | 0.133 | 10.4 | 244 |
| 28 | 0.727 | 0.126 | 7.3 | 204 |
| 29 | 0.785 | 0.135 | 8.5 | 230 |
| 30 | 0.827 | 0.143 | 9.1 | 229 |

Once again, it will be noted that only utilizing the concepts of the instant invention can a product be produced having an AFC hardness in excess of 180 with a density of less than 0.120 grams per cubic centimeter. Additionally, the great variation in product characteristics evidenced with those examples illustrating the instant invention, that is, Examples 12 to 18 and 22 to 27 compares favorably with the relatively slight variation in product characteristics utilizing conventional techniques, as in Examples 19 to 21 and 28 to 30.

Reference is now made to Table 6, below, wherein various products made according to the instant invention are compared to prior art products having similar pressure drop.

To ascertain total particulate matter (TPM) retention percent, as is also conventional, a Cambridge filter apparatus is utilized. The filter under test, in this instance, is placed in series relation with the standard Cambridge filter (the Cambridge filter being accepted in the industry as the standard having 100% retention). Then, a cigarette is puffed by the apparatus with a 35 cc. puff over a 2 second interval and at a rate of 1 puff per minute. The material collected on the filter undergoing the test and the material collected on the Cambridge filter together yield the total solids. The material or solids collected on the filter undergoing testing (as determined by a conventional weight comparison), is then compared against the total, and the retention percent of the filter under test is calculated. Commercially desirable filter elements have a TPM efficiency of at least about 25 percent for a conventional 20 mm. by 79 mm. plug. This testing method is conventional, as indicated, and accordingly, further discussion appears unnecessary. However, it will be noted from Table 6 that the filters of the instant invention are at least substantially as effective as the prior art filters in this regard.

Examples 39 and 40 show physical and functional characteristics of filters made according to this invention as modified in the manner of the procedure shown in dotted lines in FIGURE 11. In example 39, a filter comprising approximately 30% pulp, approximately 60% 3.3/44 cellulose acetate tow and approximately 10% plasticizer was produced and in Example 40 a filter comprising approximately 46% pulp, approximately 47% 3.3/44 cellulose acetate tow and approximately 7% plasticizer was produced. In each instance, fully satisfactory products are attainable, the substitution of pulp or other similar material for cellulose acetate tow reducing the cost of the filter due to the relatively low cost of this additive material.

Results similar to those set forth hereinabove with cellulose acetate tow can be realized utilizing the other filamentary materials set forth hereinabove.

Thus, it can be seen that utilizing this embodiment of the instant inventive concepts, significant advantages can be attained when compared to more conventional prior art procedures.

TABLE 6

| Example No. | Acetate Tow | Wt., 120 mm. w/o paper, gm. | Wt. 120 mm., gm. | | Density gm./cc. | P.D. 20 mm., inches H₂O | TPM Retention, Percent | Remarks |
|---|---|---|---|---|---|---|---|---|
| | | | Acetate | Plasticizer | | | | |
| 31 | 3.9/46 | 0.86 | 0.79 | 0.07 | 0.148 | 1.7 | 39 | Prior art. |
| 32 | 3.3/44 | 0.58 | 0.53 | 0.045 | 0.098 | 1.7 | (¹) | Invention. |
| 33 | 3.3/44 | 0.85 | 0.76 | 0.09 | 0.146 | 2.0 | 44.9 | Prior art. |
| 34 | 3.3/44 | 0.64 | 0.58 | 0.06 | 0.110 | 2.0 | 42.0 | Invention. |
| 35 | 3.3/44 | 0.77 | 0.72 | 0.05 | 0.133 | 2.25 | 44.8 | Prior art. |
| 36 | 3.3/44 | 0.64 | 0.58 | 0.06 | 0.110 | 2.25 | (¹) | Invention. |
| 37 | 3.3/44 | 0.86 | 0.79 | 0.07 | 0.148 | 2.5 | 47.8 | Prior art. |
| 38 | 3.3/44 | 0.66 | 0.60 | 0.06 | 0.114 | 2.5 | 46.3 | Invention. |
| 39 | 30% pulp / 60% 3.3/44 / 10% plasticizer | 0.66 | | | 0.144 | 2.3 | 46 | Do. |
| 40 | 46% pulp / 47% 3.3/44 / 7% plasticizer | 0.71 | | | 0.123 | 2.2 | 52 | Do. |

¹ Not tested.

Example 32 shows that for 1.7 inches of water pressure drop on a 20 mm. tip, a density of only 0.098 gram per cubic centimeter is necessary with the instant invention as compared to a density of 0.148 in Example 31 with prior art techniques. Similarly, for a 2.0 inch pressure drop, the instant invention in Example 34 requires a density of 0.110 as compared to a density of 0.146 in Example 33 with prior art techniques. For a 2.25 inch pressure drop the instant invention requires a density of only 0.110, as shown in Example 36 and as compared to a density of 0.133 in Example 35 for the same pressure drop. Finally, Example 38 shows the instant invention requiring a density of only 0.114 for a 2.5 inch pressure drop as compared to a density of 0.148 in Example 37 for the same pressure drop.

Reference is now made to FIGURES 14 to 22 for the embodiment of the instant invention forming stable elongated elements from particulate starting materials. In FIGURE 14, the numeral 202 generally designates a supply hopper, the numeral 204 generally designates a controllable feeding means and the numeral 206 generally designates a continuous porous belt of the type mentioned hereinabove. The belt 206 passes about a group of tensioning rollers 216, 218 and 220. The rollers 210 and 212 cooperate with other system components to maintain the path of movement of the belt 206 under the hopper 202 and feeding means 204. Thus, when particulate material is in the hopper 202 and controllably dispensed therefrom by the feeding means 204, the material passes onto the belt 206, as the belt moves under and past the feeding means.

The particulate material used in accordance herewith preferably includes a thermoplastic bonding ingredient although other "fluid-activated" bonding constituents may be utilized therewith. Preferably, the particulate material comprises a mixture of activated carbon particles and finely divided polyethylene particles having a melt index above 5.0. In this instance, the particulate material includes the activated carbon particles as the filtration ingredient and the polyethylene particles as the thermoplastic bonding ingredient. Such mixture is preferred because polyethylene has been found to have no adverse effects on the vapor phase activity of the carbon, which is important, and because such polyethylene has a suitable melt index to readily adapt it for adequate softening by the steam treatment described below. Still, neither polyethylene nor activated carbon need be used.

Other suitable sorbent materials for use in the process hereof include silica gel, alkali metal aluminosilicates, sucrose, activated alumina, perlite (volcanic ash), sepiolite, granular calcium or sodium carbonate, fuller's earth, magnesium silicate, asbestos powder, metallic oxides, such as iron oxide and aluminum oxide, metal treated carbon and combinations of these materials. Other suitable thermoplastic materials for use in the process hereof include vinyl acetates, vinyl homopolymers, vinyl copolymers, plasticized cellulose acetate, Artrite (a thermoplastic polyester resin), Escorez (a fine powdered petroleum hydrocarbon resin), vinyon and combinations thereof. Still, the thermoplastic material is preferably selected such that it has a melt index of 5 or above so that it is readily susceptible to the steam treatment in question. Where filter material—thermoplastic binder particle mixtures are used, the relationship between the particle size of the thermoplastic material and the sorbent material is also important. The particle size of the thermoplastic material should be substantially less than the particle size of the sorbent material, with the sorbent material preferably having a particle size such that it will pass at least a 12 mesh screen, and the thermoplastic material preferably having a particle size of 50 microns or less.

Notwithstanding the foregoing comments, the invention contemplates using as the particulate material, sorbent particles coated with, for example, a thermoplastic material. For example, a polyethylene emulsion can be mixed with activated carbon particles to provide a thermoplastic coating thereon. As explained below, the operation of the process would be the same in this instance as where dry separate filtration and bonding particles are used.

As as further alternative, microporous polyethylene having a density of .9 or above can be used as the particulate material. Such polyethylene appears to possess desirable sorptive properties and it also possesses thermoplastic properties. In this instance, the thermoplastic bonding ingredient would be the particulate material itself without an additional and different material, either as a coating or in dry particle form.

It will be appreciated that additional components can be added or included in the particulate material mixture to provide for additional smoke modification, filtration or taste properties. Still, the additional materials should be such that they are adapted to blend with the basic particulate ingredients and not interfere with the operations performed according to the present process as now to be described.

The particulate material utilized and supplied to the hopper 202 and then through the feeding means 204 to the belt 206 is either sufficiently mixed initially to insure a proper dusting of the binder particles over the filtration particles, sufficiently processed to insure a proper coating of the filtration particles by the binder, or it is of the special type which exhibits its own filtration and bonding properties. Bearing this in mind, as well as the immediately preceding paragraphs, the following discussion uses the term particulate material generically.

After being supplied with the proper preselected quantity of particulate material, the belt 206 leaves the feeding station 221 (FIGURE 14) and passes first to a vacuum station 222, and then into a steam treating station 224. After leaving the steam treating station 224, the belt passes preferably into a cooling or drying station 226. After leaving the station 226, the belt 206 separates from the stable element which has been formed, with the belt portion which is separated returning over its previous path, and with the formed element 230 passing into a conventional cigarette machine 232 for overwrapping and severing thereof into desired lengths.

Having now considered the materials which can be used and the overall system of FIGURE 14, attention is directed to the preferred type of equipment used at each of the stations of the system of this embodiment to effect the required and/or desired treatments.

The hopper 202 and the feeding means 204 used at the feeding station 221 can take various forms, but preferably the feeding means 204, as shown in FIGURE 15, comprises a chute 234 and a vibrating means 236 associated therewith. The vibrating means is in turn linked to a conventional vibrator control 238 and the vibrating system receives its power from a conventional power source over the leads 240. The vibrator control 238 has an adjustment knob 242 thereon which permits the operator to adjust the rate of vibration of chute 234 and thus control the quantity of material delivered along the chute 234 from the supply hopper 202 and onto the belt 206. The vibration rate is adjusted so that it is correlated to the speed of belt 206, as driven by the drive means 207 mechanically linked to drive roller 208. This adjustment of relative feed rate to belt speed readily permits control of density and porosity properties of the final product, as discussed in more detail below.

Once the vibrating means 236 has been energized, the particulate material continuously passes from the supply hopper down the chute 234, and enters a funnel 244 disposed immediately above the belt 206. As shown in FIGURE 15, the belt passes under the funnel 244, and during such passage, is supported in a guide block 246 having an arcuate recess or channel 248 extending longitudinally therealong. Thus, the belt 206 receives the particulate material with the belt itself being partially arcuately shaped at that time. This arrangement facilitates the maintenance of the particulate material within the confines of the belt.

The guide block 246 supports the belt as it moves from the feeding station to the vacuum station 222. At the vacuum station, the belt enters a vacuum guide 250. The preferred construction of this vacuum guide is shown in FIGURE 21, and by referring to such figure, it will be noted that the same generally comprises a hollow housing 252 having opposed end walls 256 and 254. Each of the end walls has an arcuate and generally semicircular recess, 258, 260 respectively, therein. These recesses are aligned with the recess 248 in the guideblock 246 disposed at, and leading from the supply station and receive the belt 206 therein, maintaining the same in shaped position as shown in FIGURE 21. The belt is not supported along the lower portion thereof between the recesses 258 and 260, instead the lower portion extends freely through the hollow housing 252. Thus, when a vacuum is applied to the housing through the inlet coupling 262 thereto, such vacuum acts to remove any particles which may be on the outside of the belt. Moreover, the vacuum preconditions the particulate material for its subsequent steam treatment. In essence, a partial vacuum is created within the material on the belt is the same passes through the vacuum station, and thus when the belt enters the steam treating station 224, it is preconditioned to readily receive the desired steam treatment.

Furthermore, the vacuum step is desirable because it tends to draw any steam leaving the steam treating station 224 so that the steam does not interfere with the particles entering the steam treating station, i.e., tend to disperse them from their position on the belt.

As the belt 206 enters the steam treating station 224, it is closed about its periphery. In other words, as shown specifically in FIGURES 16 and 17, the belt is shaped from its partial open condition as it leaves the vacuum housing 252 to an entirely closed condition as it enters the steam treating housing 260 at station 224. In fact, the belt is somewhat closed at it moves through the vacuum station due to the complete closing that is obtained at the steam treating station 224.

It should be here noted that the belt can be closed partially or fully during its passage through the vacuum station 222. For example, the recess 260 in vacuum housing 252 can be semicircular and recess 258 substantially a closed circle, in which event, the belt 206 will be closed as it leaves the vacuum station. In any event, the important consideration is that a vacuum is applied to the material to precondition it for the steam treatment, as this operation facilitates a better ultimate product for the reasons given above.

Now, turning to the steam treating station, again a housing is preferably utilized. This housing, as generally deignated by numeral 261 and as shown in FIGURE 18, has a longitudinal passageway 263 extending therethrough. This passageway has a cross-section so dimensioned that it receives only a rod of the ultimate desired cross-section as covered by the then closed belt 206. Leading into the passageway 263 are a plurality of inlet bores 264 which extend and terminate at one of their ends about the periphery of the passageway 263, and which terminate at their opposite ends in communication with a supply channel 266 in housing 260. The supply channel is ring-shaped and receives steam through an inlet 268 thereto. In operation, the steam passes through the inlet 268 to the channel 266 and then the same distributes itself through the bores 264 and passes into and through the belt 206 which at that time is moving through the passageway 263.

For purposes of the steam treatment just described, for purposes of the vacuum treatment described previously, and for purposes of the drying treatment to be described below, the belt 206 is sufficiently porous or pervious as described with respect to the previous embodiments that the respective gas mediums, i.e., air and steam, can penetrate to and act on the particulate material within the belt or carried hereon. Preferably, the belt has a woven construction as mentioned earlier with the pores in the belt preferably being smaller than at least the larger particles of the particulate material.

In this regard, it has been found that where finely divided dry binder particles are used with larger sorbent particles, the binder particles tend to adhere to the sorbent particles after mixing therewith and even with the binder particles in their initial dry state so that the porosity of the belt need merely be controlled in accordance with the particle size of the larger and/or sorbent particles.

Now, returning to the operation of the system of FIGURE 14 in accordance with the method of the invention, it is to be understood that as the steam passes into the particulate material which enters the steam treating station, the same serves to soften the thermoplastic ingredient of the particulate material and thereby bond the particulate material into a stable element. In FIGURE 20(a), the particulate material is schematically illustrated as enclosed within the belt 206 when the vacuum is acting thereon and before the steam has effectively acted thereon. In contrast, FIGURE 20(b) presents the particulate material after the steam has acted thereon. It will be noted that the steam tends to disperse and aerate the particulate material so that the same completely fills the interior of the then closed belt 206. Depending on the quantity of material initially fed to the belt as controlled by the relative belt speed and feed chute vibration rate, the porosity, density and pressure drop of the ultimate rod can be easily controlled. If the belt is completely filled initially, then the final rod which is formed is more dense, less porous and harder, and as the belt is filled less and less, the porosity, density and hardness decrease.

The particulate material is cured and thus stable as it leaves the steam treating station 224, but preferably it is maintained within the confines of the then closed belt and passes on to the cooling station 226. The cooling station is preferably formed by a cooling housing 270 such as shown in FIGURE 19. This housing includes a passageway 272, a plurality of bores 274, a supply channel 276, and an inlet 278. Air is introduced through the inlet 278 and passes to the supply channel 276, then through the bores 274 and thereafter through the belt 204 into the particulate material. This air treatment serves to cool the formed rod and eliminate any condensation which may remain therein. Furthermore, the air treatment insures the desired porosity being maintained. Preferably, as shown, the air is injected countercurrent to path of movement of the belt and the material through the cooling station 226 and at an angle of about 45°.

The belt 206 discussed above actually provides a porous flexible elongated moving surface which can be shaped to thereby shape and confine the material carried thereon. Although this belt preferably has its porosity so limited as to prevent the passage of any of the particulate material therethrough, the belt could have somewhat greater porosity, in which event the vacuum housing would include some support for the belt, such as a screen underlying the bottom portion of the belt as is passed through the vacuum housing.

The preferred embodiment of the invention contemplates using a woven nylon belt and treating such nylon belt with a silicone emulsion. The emulsion improves the water resistance of the belt and tends to prevent adhesion between the belt fibers and the particulate material. While the preferred material for the belt is nylon as indicated, any reasonably dimensionally stable belt can be used.

In the preceding discussion, the steam has been discussed particularly in connection with the bonding of the particulate material and the porosity of the final structure. It is important to understand, however, that the steam can well serve an additional purpose, namely, the activation of activatable material or the reactivation of previously activated material. For example, when activated carbon is used, the steam treatment tends to reactivate the carbon, thereby improving the filtration or sorption properties thereof. If contaminated particulate material is used, then the steam can serve to activate the same initially.

In addition to noting the activating advantages which can be obtained with the steam treatment, it should be noted that certain characteristics of the steam treatment have been found to provide particularly desirable results. Specifically, it has been found that the length of the steam chamber in which the closed belt with the material is confined, should be greater than the length of one segment of the filter rod as ultimately formed. As indicated above, the cigarette making machine 232 (FIGURE 14) serves to cut the formed rod which has entered the same into segments. Such machine thus includes a cutting means 290 for this purpose. The cut segments, e.g., segments 206a have a length "D," as shown in FIGURE 14. This length D is used preferably to predetermine the minimum length of the steam housing through which belt 206 passes before encountering the steam inlets. Specifically, according to the preferred embodiment hereof, the length "L" which the belt passes within the steam chamber before encountering the steam inlets (inner ends of bores 264, FIGURE 18), is preferably greater than the length D. During its passage through the length L, the ultimate rod is confined within the then closed belt and has substantially its final cross-sectional dimension, i.e., diameter as shown.

It will be understood from the preceding discussion that the process hereof serves to form a continuous rod which enters the cigarette making machine 232. This rod is itself stable (i.e., self-sustaining) and need not necessarily be enclosed within an overwrap. However, if desired, an overwrap can be applied thereon in conventional manner, and the rod then cut into segments of desired length.

Although a circular rod has been described herein those familiar with the art will readily appreciate the fact that other shapes can be easily formed in accordance with the process hereof by merely varying passageways and/or guide member contours.

The advantages afforded by the process hereof should be apparent. Specifically, the process is mechanically simple, uses readily available treating media, and can be operated at high speeds, suitable for commercial production. Further advantages also exist. For example, cigarette filters which have been made according to the invention have exhibited substantially better filtration properties than filters made by prior techniques. Specifically, as shown by FIGURE 22, the bonded activated carbon product hereof has a gas output or gas phase wherein the generally harmful ingredients are substantially reduced throughout the entire useful life of a cigarette with which the filter is associated (i.e., ten or eleven puffs). FIGURE 22 presents an illustrative approximate plot of number of puffs versus concentration of harmful constituents in the gas output phase of a unit. The line A represents the harmful constituent content of the gas output or gas phase from a standard cigarette having a filter made in accordance with the present invention and Example 41 below.

The harmful constituent content of the output (i.e., objectionable smoke constituent molecules) was extremely low even after eleven puffs. In contrast, the harmful constituent content of the standard cigarette with prior art filters (e.g., filters including a body of loose carbon between respective fibrous filter sections) as represented by line B, was substantially higher from start to finish. The line designated "control" indicates the harmful constituent content in the output from the standard cigarette without any filter. It will be noted that the prior art filter, as tested with loose activated carbon, has a high harmful constituent output at the start and approaches the control value as more and more puffs are taken up to and including the ten-puff normal maximum life, with the harmful constituent output of such prior art construction reaching the control value at about eleven puffs. The product of the invention referred to above, does not even approach the initial harmful constituent output of the prior art filter when the end of the life of the filter hereof is contrasted against the beginning of the life of the prior art filter. Although FIGURE 22 generally presents actual test results, the same were obtained under idealized laboratory test conditions. Still, it appears that the increased efficiency acheived and the properties that have been exhibited continue during the normal shelf life of cigarettes or other tobacco products, in fact.

The following example sets forth one set of conditions that have proved satisfactory in performing the process hereof using activated carbon particles but it is to be understood that the conditions of the example are illustrative, and not necessarily limiting.

Example 41

A mixture of the activated carbon particles and polyethylene particles was made. The polyethylene particles were approximately 50 microns or less and had a melt index of approximately 20. Substantially all the activated carbon particles passed a 20 mesh screen but would not pass a 50 mesh screen. After the mixture was made, it was placed in a hopper such as the hopper 202 of FIGURE 14 and the described process was carried out. Steam having a temperature ranging between 250° and 300° F. was supplied to the steam treating housing at the rate of approximately 10 lbs./hr. Air was supplied to the drying housing at the rate of approximately 10 ft.$^3$/min. A vacuum of approximately 1 inch of $H_2O$ was created at the vacuum treating station. The belt was operated at a linear speed of about 30 meters/min., and the formed rod had a diameter of approximately 8 mm. The vibrating means was so adjusted with respect to belt speed that the formed rod had a pressure drop of approximately 1 inch along each 10 mm. of its length when pressure drop was measured in accordance with the conventional cigarette filter test method.

Aside from the above advantages, it has been found that when the element hereof is subjected to the air treatment (or other inert gas treatment) at station 226, there is a very slight shrinkage of the element which tends to free the periphery of the element from engagement with the belt. Also, it should be noted that the element fed to the overwrap machine 232 will take and hold a dry overwrap without the application of glue lines other than on the overlapping edges of the overwrap. While it is ordinarily customary to include at least one internal glue line on the wrapper which adheres to the filter body, with the product of this invention only the overlapping edges need be adhered. One further, but particularly significant advantage of this invention is that the process is dry—i.e., there are no solvents or other liquids required which can deactivate any activated material used. The filter hereof is preferably used as at least one-third of any complete filter in an ultimate cigarette, with the portion of the filter which is not made hereunder, if any, being of the tow or paper type, and being disposed at the outer rear end of the cigarette.

Having now decsribed the process hereof, having presented illustrative examples of products made in accordance with the various embodiments hereof and having set forth various advantages of the process, it should be apparent that the objects set forth at the outset of this specification have been successfully achieved. Accordingly,

What is claimed is:

1. A process of making a stable elongated element from a material including a bonding constituent activated by contact with a fluid, said process comprising the steps of:
   (a) feeding said material onto a flexible, elongated, porous, moving surface;
   (b) then shaping said moving surface and thereby said material fed thereon into a predetermined shape;
   (c) while moving said surface and maintaining said surface and said material in said shape, passing said fluid through said surface and into contact with said material to activate said bonding constituent and bond said material into a stable continuous element of said shape; and
   (d) separating said element from said surface.

2. The process defined in claim 1 wherein said material is in the form of a mixture of a particulate sorbent material and a separate bonding agent therefor, said bonding agent being activated by contact with steam and said fluid being steam.

3. The process defined in claim 1 wherein said material includes plasticized cellulose acetate and said fluid is steam.

4. The process defined in claim 3 wherein said plasticized cellulose acetate is in the form of a substantially continuous filamentary tow.

5. The process defined in claim 3 wherein said plasticized cellulose acetate is in the form of staple fibers.

6. The process defined in claim 1 wherein said material is initially in the form of a substantially continuous filamentary tow, further including, prior to step (a):

(i) chopping said filamentary tow into a multiplicity of staple fibers;
(ii) dispersing said staple fibers in a turbulent air stream;
(iii) blowing said turbulent air stream containing said dispersed staple fibers through a porous enclosing means to dissipate at least a major portion of said air stream while confining said staple fibers to a reduced cross-sectional area; and
(iv) then feeding said staple fibers onto said moving surface as in step (a).

7. The process defined in claim 6 wherein only a portion of said air stream is dissipated in step (iii), the remainder of said air stream being used to feed said staple fibers onto said moving surface, further including dissipating said remainder of said air stream prior to step (c).

8. The process defined in claim 6 further including dispersing an additive material in said turbulent air stream with said staple fibers in step (ii), blowing said turbulent air stream containing said mixture of staple fibers and additive material through said porous enclosing means and then feeding said mixture of staple fibers and additive material onto said moving surface.

9. The process defined in claim 1 further including the step of passing a cooling gas through said surface and into contact with said material while moving said surface and maintaining said surface and said material in said shape, said last-mentioned step being effected after step (c) and before step (d).

10. The process defined in claim 1 further including the steps of continuously monitoring the pressure-drop characteristics of said element after the same is separated from said surface, and varying the quantity of said material fed onto said surface in response to any changes in pressure-drop to maintain substantially constant pressure-drop characteristics in said element.

11. A process of making a stable elongated element from particulate material including a thermoplastic bonding ingredient, said process comprising the steps of:
(a) feeding said material onto a porous flexible elongated moving surface;
(b) then shaping said surface and thereby the material fed thereon into a predetermined shape;
(c) while maintaining said surface and said material in said shape, passing steam through said surface and into said material to soften said thermoplastic ingredient and bond said particulate material into a stable element of said shape; and
(d) then separating said element from said surface.

12. The process defined in claim 11 and further including the step of subjecting said material fed onto said surface to a vacuum prior to passing steam therethrough.

13. The process defined in claim 12 wherein said surface with said material thereon is moved over and through a partially evacuated area to subject the material to said vacuum through said surface.

14. The process defined in claim 12 and further including the step of passing an inert gas through said surface and into said material following said step (c) and prior to said step (d) so as to cool said stable element.

15. The process defined in claim 11 wherein at least a predominant portion of said particulate material consists of microporous polyethylene.

16. The process defined in claim 11 wherein said particulate material consists predominately of a particulate filtration material selected from the group consisting of activated carbon, silica gel, alkali metal aluminosilicates, sucrose, activated alumina, volcanic ash, sepiolite, granular calcium carbonate, granular sodium carbonate, fuller's earth, magnesium silicate, asbestos powder, metallic oxides, metal treated carbon and combinations thereof, and wherein the particle size of said filtration material is substantially larger than the particle size of said binding material.

17. The process defined in claim 11 wherein said particulate material consists predominately of particulate filtration material particles coated with said thermoplastic ingredient.

18. The process defined in claim 11 wherein step (c) is carried out by confining said surface and said material while in said predetermined shape in an area having a cross-section substantially equal to the cross-section of said element for a predetermined length, and passing steam into said area only at locations spaced a substantial distance from the opposite ends of said length.

19. A process of making stable elongated elements from particulate material including a thermoplastic bonding ingredient, said process comprising the steps of:
(a) feeding said material onto a continuous flexible elongated moving surface;
(b) then shaping said moving surface and thereby said material fed thereon into a predetermined shape;
(c) while moving said surface and maintaining said surface and said material in said shape, passing steam into said material to soften said thermoplastic ingredient and bond said particulate material into a stable continuous element of said shape;
(d) then separating said element from said surface; and
(e) thereafter severing said continuous element into segments of at least substantially equal predetermined lengths to form said elongated elements.

20. The process defined in claim 19 wherein said surface and said material are confined in an area of said shape having a cross-section substantially equal to the cross-section of said surface and material as in said predetermined shape for a distance greater than the predetermined length of one of said segments, prior to and while said steam is passed into said material.

21. The process defined in claim 19 and further including the steps of subjecting said material through said surface to a vacuum immediately before performing said step (c), and passing air through said surface and into said material following said step (c).

22. A process of making a stable elongated filter element from particulate material including a thermoplastic bonding ingredient, said process comprising the steps of:
(a) confining said particulate material within an elongated moving porous enclosing surface having an interior shape corresponding to the ultimate shape of said element; and
(b) while maintaining said particulate material so confined, passing steam through said enclosing surface and into said material to soften said thermoplastic ingredient and bond said particulate material into a stable element of said shape.

23. The process defined in claim 22 wherein said particulate material includes an activatable substance, and wherein step (b) is carried out so as to at least partially activate said substance simultaneously with the softening of the thermoplastic ingredient and bonding of the particulate material.

24. The process defined in claim 22 wherein said particulate material consists essentially of activated carbon particles and substantially smaller polyethylene particles, said carbon particles being present in major amount by weight and said polyethylene particles being present in minor amount by weight.

25. A process of making a stable elongated element from particulate material including a thermoplastic bonding ingredient, said process comprising the steps of:
(a) feeding said material onto a porous flexible elongated moving belt in controlled correlation to the speed of movement of said belt;
(b) then shaping said belt and thereby the material fed thereon into a predetermined closed shape with the material substantially, but not completely filling, the space within said belt as shaped;
(c) then while maintaining said belt and said material in said shape, passing steam through said belt and into said material to soften said thermoplastic ingredient and bond said particulate material into a stable element of said shape and cause complete filling of the space within said belt as shaped by the particulate material being dispersed under the influence of said steam; and (d) then separating said element from said surface.

26. The process defined in claim 25 wherein said feeding step is carried out by moving said material across a vibrating surface, and wherein the rate of vibration of said surface is correlated to the speed of said belt.

27. The process defined in claim 25 wherein said particulate material consists predominately of a particulate filtration material selected from the group consisting of activated carbon, silica gel, alkali metal aluminosilicates, sucrose, activated alumina, volcanic ash, sepiolite, granular calcium carbonate, granular sodium carbonate, fuller's earth, magnesium silicate, asbestos powder, metallic oxides, metal treated carbon and combinations thereof, and wherein the particle size of said filtration material is substantially larger than the particle size of said binding material.

28. The process defined in claim 25 and further including the step of passing an inert gas through said surface and into said material following step (c), to cool the element and slightly shrink the same to free engagement thereof with said surface.

29. The process defined in claim 28 and further including the step of applying an overwrap to said element after cooling thereof.

30. A process of making a stable elongated element from a material including a continuous filamentary tow having a steam-activated bonding constituent, said process comprising the steps of:

(a) defining a steam-treating station;
(b) defining a cooling station;
(c) providing a continuous, flexible, porous moving surface;
(d) feeding said material onto said moving surface in advance of said steam-treating station;
(e) forming said moving surface and thereby said material fed thereon into a predetermined shape;
(f) while maintaining said surface and said material in said shape, moving the same through said steam-treating station and passing steam through said surface and into said material to activate said bonding constituent;
(g) while maintaining said surface and said material in said shape, moving the same from said steam-treating station through said cooling station and passing a cooling gas through said surface and into said material to set said bonding constituent and bond said material into a stable continuous element of said shape; and
(h) separating said element from said surface.

31. The process defined in claim 30 wherein said continuous tow consists essentially of plasticized cellulose acetate.

32. The process defined in claim 30 wherein said steam and inert gas are successively passed through said surface and into said material throughout its length.

33. The process defined in claim 30 further including the step of severing said continuous element into segments of at least substantially equal predetermined lengths after separating the same from said surface.

34. The process defined in claim 30 further including the steps of substantially uniformly dispersing an additive into said tow prior to steam-treating the same.

35. The process defined in claim 30 wherein said tow consists essentially of a multiplicity of cellulose acetate filaments and wherein prior to feeding said material onto said moving surface, said tow is spread into a relatively thin layer, a plasticizer is applied to said layer to form a plasticized tow, and an additive is substantially uniformly dispersed in said plasticized tow.

36. The process defined in claim 35 wherein, prior to feeding said material onto said moving surface, said additive is spread across at least the major portion of the width of said plasticized tow while the same is maintained in said relatively thin layer.

37. A process for making a stable elongated substantially cylindrical element from a continuous filamentary tow having a steam-activated bonding constituent, said process comprising the steps of:

(a) defining a steam-treating station having a confined area of a general elliptical cross-section;
(b) defining a cooling station having a confined area of a generally circular cross-section corresponding substantially to the cross-sectional shape of said cylindrical element;
(c) providing a continuous, flexible, porous, moving surface having a pair of spaced longitudinal edge portions;
(d) feeding said tow onto said moving surface in advance of said steam-treating station;
(e) bending said edge portions of said moving surface around said tow until said edge portions are substantially juxtaposed to define a longitudinal seam on said tow;
(f) moving said surface and said tow therein through said confined area of said steam-treating station to form said tow into said elliptical cross-section and passing steam through said surface and into said tow while said tow is so-confined to activate said bonding constituent;
(g) moving said surface and said tow therein from said steam-treating station and pressing said longitudinal seam to remove the same and to simultaneously re-form said tow into said circular cross-section;
(h) moving said surface and said tow therein through said confined area of said cooling station to maintain said tow in said circular cross-section and passing an inert cooling gas through said surface and into said tow while said tow is so-confined to set said bonding constituent and bond said tow into a stable continuous element of said circular cross-section; and
(i) separating said element from said surface.

38. The process defined in claim 37 wherein said continuous tow consists essentially of plasticized cellulose acetate.

39. The process defined in claim 37 further including the step of serving said continuous element into segments of at least substantially equal predetermined lengths after separating the same from said surface.

40. The process defined in claim 37 further including the step of substantially uniformly dispersing an additive into said tow prior to steam-treating the same.

41. The process defined in claim 37 wherein said moving surface is an endless, flexible, porous belt having a width slightly smaller than the circumference of said elliptical cross-section of said confined area of said steam-treating station and substantially equal to the circumference of said circular cross-section of said confined area of said cooling station.

42. The process defined in claim 41 wherein said endless belt is flattened as said element is separated therefrom and continuously orbited to receive said tow in advance of said steam-treating station.

43. The process of making a stable elongated element from a material including a continuous filamentary tow having a steam-activated bonding constituent, said process comprising the steps of:

(a) chopping said filamentary tow into a multiplicity of staple fibers;
(b) dispersing said staple fibers in a turbulent air stream;
(c) blowing said turbulent air stream containing said dispersed staple fibers through a porous enclosing means to dissipate at least a major portion of said air stream while confining said staple fibers to a reduced cross-sectional area;

(d) feeding said staple fibers onto a flexible, elongated porous, moving surface;

(e) shaping said moving surface and thereby said staple fibers fed thereon into a predetermined shape;

(f) while moving said surface and maintaining said surface and said material in said shape, passing steam through said surface and into contact with said staple fibers to activate said bonding constituent and bond said staple fibers into a stable continuous element for said shape; and (g) separating said element from said surface.

44. The process defined in claim 43 wherein said filamentary tow includes plasticized cellulose acetate.

45. The process defined in claim 43 wherein only a portion of said air stream is dissipated in step (c), the remainder of said air stream being used to feed said staple fibers onto said moving surface in step (d), further including dissipating said remainder of said air stream prior to step (f).

46. The process defined in claim 43 further including dispersing an additive material in said turbulent air stream with said staple fibers in step (b), blowing said turbulent air stream containing said mixture of staple fibers and additive material through said porous enclosing means and then feeding said mixture of staple fibers and additive material onto said moving surface.

47. The process defined in claim 43 wherein said additive material is selected from the group consisting of kraft pulp, sulphite pulp, alpha pulp, shredded bagasse, cotton linters, wool, glass fibers, viscose fibers, activated carbon, silica gel, alkali metal aluminosilicates, sucrose, activated alumina, volcanic ash, sepiolite, granular calcium carbonate, granular sodium carbonate, fuller's earth, magnesium silicates, asbestos powder, metallic oxides, metal treated carbon, metal fibers, fibrous carbon, menthol, finely divided polyethylene, finely divided polypropylene, and combinations thereof.

48. The process of claim 43 wherein said staple fibers produced in step (a) are dispersed in a turbulent air stream in step (b) and blown into said porous enclosing means in step (c) by drawing an air stream through a defined path in a confined area creating a vacuum at an entrance to said confined area and a positive pressure at an exit from said confined area, sucking said staple fibers into said entrance by means of said vacuum, passing said air stream containing said staple fibers through said defined path to create a turbulence in said air stream, and blowing said turbulent air stream containing said dispersed staple fibers through said porous enclosing means from said exit by means of said positive pressure.

49. The process defined in claim 43 further including the step of passing a cooling gas through said surface and into contact with said material while moving said surface and maintaining said surface and said staple fibers in said shape, said last-mentioned step being effected after step (f) and before step (g).

50. The process defined in claim 43 further including the step of severing said continuous element into segments of at least substantially equal predetermined lengths after separating the same from said surface.

References Cited

UNITED STATES PATENTS

| | | | |
|---|---|---|---|
| 2,796,810 | 6/1957 | Muller. | |
| 2,805,671 | 9/1957 | Hackney et al. | |
| 2,923,034 | 2/1960 | Dickie et al. | 264—123 |
| 3,144,025 | 8/1964 | Erlich. | |
| 3,230,287 | 1/1966 | Caron et al. | 264—109 |
| 2,544,019 | 3/1951 | Heritage | 264—122 |

ROBERT F. WHITE, *Primary Examiner.*

J. R. HALL, *Assistant Examiner.*